United States Patent
Shafin et al.

(10) Patent No.: US 12,550,213 B2
(45) Date of Patent: Feb. 10, 2026

(54) METHOD AND APPARATUS FOR LINK NEGOTIATION FOR MULTI-LINK MULTI-RADIO OPERATION

(71) Applicant: Samsung Electronics Co., Ltd., Suwon-si (KR)

(72) Inventors: Rubayet Shafin, Allen, TX (US); Boon Loong Ng, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 414 days.

(21) Appl. No.: 18/183,102

(22) Filed: Mar. 13, 2023

(65) Prior Publication Data

US 2023/0309167 A1  Sep. 28, 2023

Related U.S. Application Data

(60) Provisional application No. 63/323,613, filed on Mar. 25, 2022.

(51) Int. Cl.
  *H04W 76/15* (2018.01)
(52) U.S. Cl.
  CPC ................................ *H04W 76/15* (2018.02)
(58) Field of Classification Search
  CPC .............................. H04W 76/15; H04W 76/16
  See application file for complete search history.

(56) References Cited

U.S. PATENT DOCUMENTS

| | | | |
|---|---|---|---|
| 2022/0029736 A1 | 1/2022 | Chu et al. | |
| 2024/0267968 A1* | 8/2024 | Takada | H04W 76/11 |
| 2024/0381466 A1* | 11/2024 | Sevin | H04B 7/063 |
| 2024/0407031 A1* | 12/2024 | Lin | H04L 5/0053 |
| 2025/0016860 A1* | 1/2025 | Lorgeoux | H04W 76/34 |

OTHER PUBLICATIONS

International Search Report and Written Opinion issued Jun. 19, 2023 regarding International Application No. PCT/KR2023/003748, 9 pages.
Lorgeoux et al., "CC36 CR for EMLMR Links Sets", doc.: IEEE 802.11-22/0028r0, Jan. 2022, 8 pages.
Hwang et al., "TID-to-Link mapping in eMLSR", doc.: IEEE 802.11-21/1747r0, Oct. 2021, 6 pages.
Lu et al., "CC36 Cr for EMLMR Links", doc.: IEEE 802.11-21/1840r4, Mar. 2022, 9 pages.
Ratnam et al., "CR for CIDs related to EMLSR Group-addressed frame Reception", doc.: IEEE 802.11-22/0335r2, Mar. 2022, 6 pages.

(Continued)

*Primary Examiner* — Will W Lin

(57) ABSTRACT

Methods and apparatuses for supporting link negotiation for enhanced multi-link multi-radio operation are provided. A method of wireless communication performed by a non-access point (AP) multi-link device (MLD) comprises: receiving, from an AP affiliated with an AP MLD, a first enhanced multi-link operating mode notification (EML OMN) frame associated with a request to transition to an enhanced multi-link multi-radio (EMLMR) mode; and based on receipt of the first EML OMN frame, negotiating links for EMLMR operation between the AP MLD and the non-AP MLD before transitioning to the EMLMR mode.

18 Claims, 16 Drawing Sheets

(56) References Cited

OTHER PUBLICATIONS

IEEE P802.11be™/D1.4, "Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 8: Enhancements for extremely high throughput (EHT)", Jan. 2022, 787 pages.

IEEE P802.11be™/D3.0, "Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 8: Enhancements for extremely high throughput (EHT)", Jan. 2023, 999 pages.

Extended European Search Report issued Feb. 18, 2025 regarding Application No. 23775279.5, 14 pages.

Kwon, "MAC MLO EMLMR TBDs", doc.: IEEE 802.11-21/0335r07, May 2021, 7 pages.

Lu et al., "CC36 Cr for EMLMR Links", doc.: IEEE 802.11-21/1840r3, Feb. 2022, 9 pages.

\* cited by examiner

US 12,550,213 B2

METHOD AND APPARATUS FOR LINK NEGOTIATION FOR MULTI-LINK MULTI-RADIO OPERATION

CROSS-REFERENCE TO RELATED APPLICATION AND CLAIM OF PRIORITY

This application claims priority under 35 U.S.C. § 119(e) to U.S. Provisional Patent Application No. 63/323,613 filed on Mar. 25, 2022, which is hereby incorporated by reference in its entirety.

TECHNICAL FIELD

This disclosure relates generally to transmission efficiency in wireless communications systems that include multi-link devices. Embodiments of this disclosure relate to methods and apparatuses for supporting link negotiation for enhanced multi-link multi-radio operation.

BACKGROUND

Wireless local area network (WLAN) technology allows devices to access the internet in the 2.4 GHz, 5 GHz, 6 GHz, or 60 GHz frequency bands. WLANs are based on the Institute of Electrical and Electronic Engineers (IEEE) 802.11 standards. The IEEE 802.11 family of standards aim to increase speed and reliability and to extend the operating range of wireless networks.

Multi-link operation (MLO) is a feature that is currently being developed by the standards body for next generation extremely high throughput (EHT) Wi-Fi systems in IEEE 802.11be. The Wi-Fi devices that support MLO are referred to as multi-link devices (MLD). With MLO, it is possible for a non-access point (AP) multi-link device (MLD) to discover, authenticate, associate, and set up multiple links with an AP MLD. Channel access and frame exchange is possible on each link between the AP MLD and non-AP MLD.

SUMMARY

Embodiments of the present disclosure provide methods and apparatuses for supporting link negotiation for enhanced multi-link multi-radio operation.

In one embodiment, a non-AP MLD is provided, comprising: a station comprising a transceiver configured to receive, from an AP affiliated with an AP MLD, a first enhanced multi-link operating mode notification (EML OMN) frame associated with a request to transition to an enhanced multi-link multi-radio (EMLMR) mode. The non-AP MLD further comprises a processor operably coupled to the transceiver, the processor configured, based on receipt of the first EML OMN frame, to negotiate links for EMLMR operation between the AP MLD and the non-AP MLD before transitioning to the EMLMR mode.

In another embodiment, an AP MLD is provided, comprising: an AP comprising a transceiver. The AP MLD further comprises a processor operably coupled to the transceiver, the processor configured to: generate a first enhanced multi-link operating mode notification (EML OMN) frame associated with a request to transition to an enhanced multi-link multi-radio (EMLMR) mode; determine whether to accept transitioning to the EMLMR mode; configure the EML OMN frame based on whether transitioning to the EMLMR mode is accepted; and negotiate links for EMLMR operation between the AP MLD and a non-AP MLD before transitioning to the EMLMR mode. The transceiver is configured to transmit the EML OMN frame to a station (STA) associated with the non-AP MLD.

In another embodiment, a method of wireless communication performed by a non-AP MLD is provided. The method comprises: receiving, from an AP affiliated with an AP MLD, a first enhanced multi-link operating mode notification (EML OMN) frame associated with a request to transition to an enhanced multi-link multi-radio (EMLMR) mode; and based on receipt of the first EML OMN frame, negotiating links for EMLMR operation between the AP MLD and the non-AP MLD before transitioning to the EMLMR mode.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. As used herein, such terms as "1st" and "2nd," or "first" and "second" may be used to simply distinguish a corresponding component from another and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure provide mechanisms for supporting link negotiation for next generation enhanced multi-link multi-radio operation.

Figure 1:
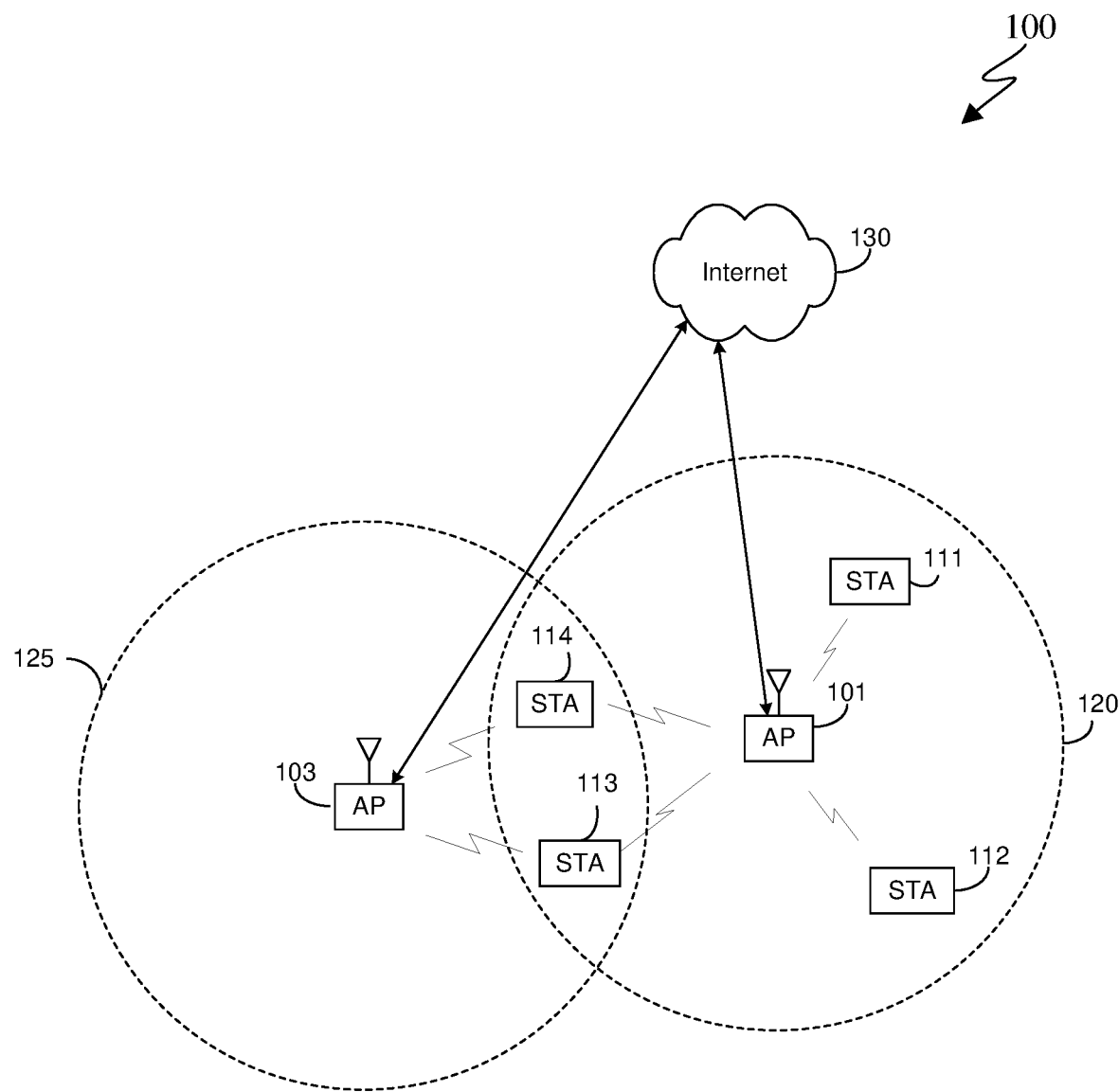
FIG. 1 illustrates an example wireless network according to various embodiments of the present disclosure.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of this disclosure.

The wireless network 100 includes APs 101 and 103. The APs 101 and 103 communicate with at least one network 130, such as the Internet, a proprietary Internet Protocol (IP) network, or other data network. The AP 101 provides wireless access to the network 130 for a plurality of STAs 111-114 within a coverage area 120 of the AP 101. The APs 101-103 may communicate with each other and with the STAs 111-114 using Wi-Fi or other WLAN communication techniques.

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA (e.g., an AP STA). Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.). This type of STA may also be referred to as a non-AP STA.

In various embodiments of this disclosure, each of the APs 101 and 103 and each of the STAs 111-114 may be an MLD. In such embodiments, APs 101 and 103 may be AP MLDs, and STAs 111-114 may be non-AP MLDs. Each MLD is affiliated with more than one STA. For convenience of explanation, an AP MLD is described herein as affiliated with more than one AP (e.g., more than one AP STA), and a non-AP MLD is described herein as affiliated with more than one STA (e.g., more than one non-AP STA).

Dotted lines show the approximate extents of the coverage areas 120 and 125, which are shown as approximately circular for the purposes of illustration and explanation only. It should be clearly understood that the coverage areas associated with APs, such as the coverage areas 120 and 125, may have other shapes, including irregular shapes, depending upon the configuration of the APs and variations in the radio environment associated with natural and man-made obstructions.

As described in more detail below, one or more of the APs may include circuitry and/or programming for supporting link negotiation for next generation enhanced multi-link multi-radio operation. Although FIG. 1 illustrates one example of a wireless network 100, various changes may be made to FIG. 1. For example, the wireless network 100 could include any number of APs and any number of STAs in any suitable arrangement. Also, the AP 101 could communicate directly with any number of STAs and provide those STAs with wireless broadband access to the network 130. Similarly, each AP 101-103 could communicate directly with the network 130 and provide STAs with direct wireless broadband access to the network 130. Further, the APs 101 and/or 103 could provide access to other or additional external networks, such as external telephone networks or other types of data networks.

Figure 2A:
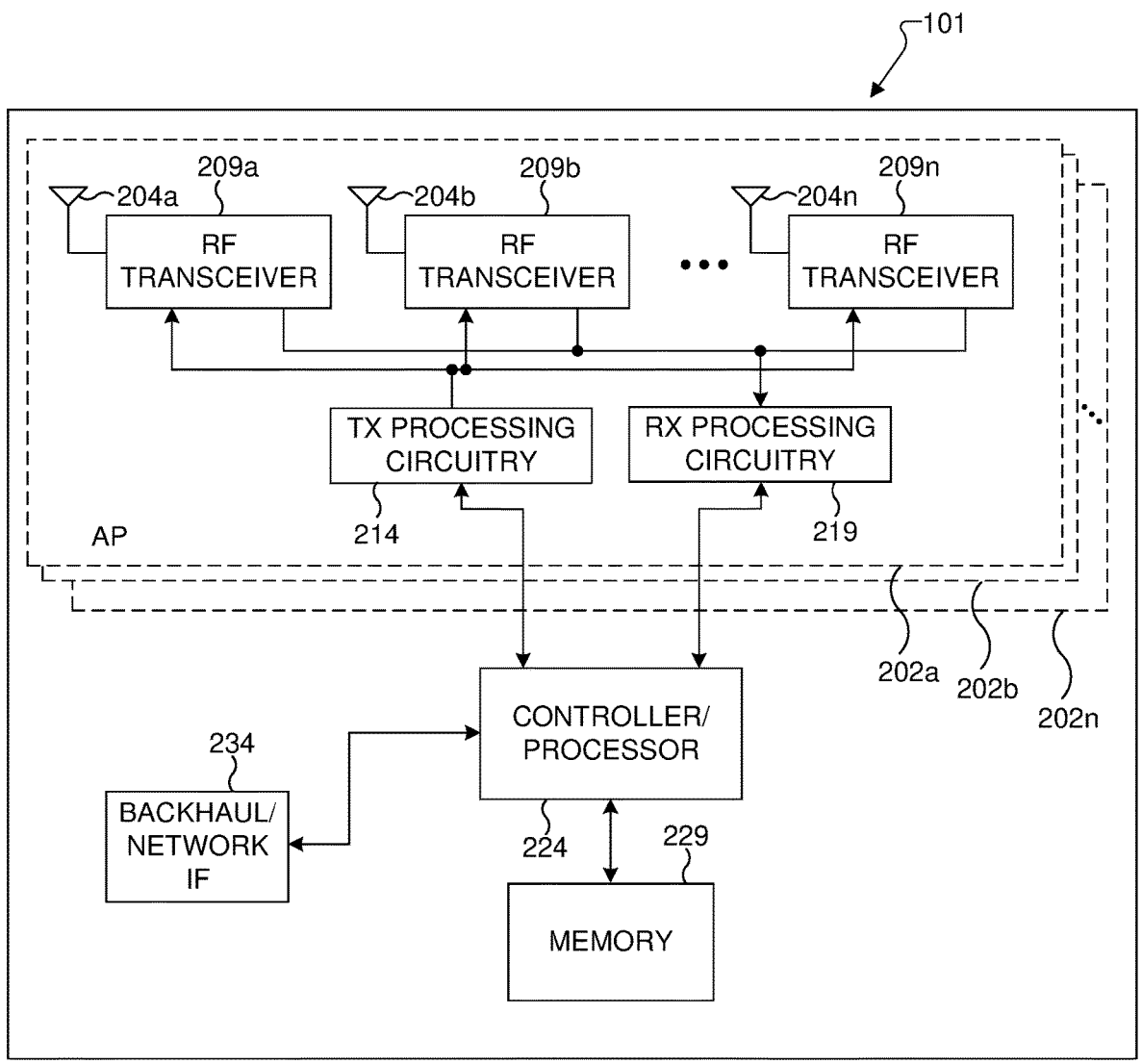
FIG. 2A illustrates an example AP according to various embodiments of the present disclosure.

FIG. 2A illustrates an example AP 101 according to various embodiments of the present disclosure. The embodiment of the AP 101 illustrated in FIG. 2A is for illustration only, and the AP 103 of FIG. 1 could have the same or similar configuration. In the embodiments discussed herein below, the AP 101 is an AP MLD. However, APs come in a wide variety of configurations, and FIG. 2A does not limit the scope of this disclosure to any particular implementation of an AP.

The AP MLD 101 is affiliated with multiple APs 202a-202n (which may be referred to, for example, as AP1-APn). Each of the affiliated APs 202a-202n includes multiple antennas 204a-204n, multiple RF transceivers 209a-209n, transmit (TX) processing circuitry 214, and receive (RX) processing circuitry 219. The AP MLD 101 also includes a controller/processor 224, a memory 229, and a backhaul or network interface 234.

The illustrated components of each affiliated AP 202a-202n may represent a physical (PHY) layer and a lower media access control (LMAC) layer in the open systems interconnection (OSI) networking model. In such embodiments, the illustrated components of the AP MLD 101 represent a single upper MAC (UMAC) layer and other higher layers in the OSI model, which are shared by all of the affiliated APs 202a-202n.

For each affiliated AP 202a-202n, the RF transceivers 209a-209n receive, from the antennas 204a-204n, incoming RF signals, such as signals transmitted by STAs in the network 100. In some embodiments, each affiliated AP 202a-202n operates at a different bandwidth, e.g., 2.4 GHz, 5 GHz, or 6 GHz, and accordingly the incoming RF signals received by each affiliated AP may be at a different frequency of RF. The RF transceivers 209a-209n down-convert the incoming RF signals to generate IF or baseband signals. The IF or baseband signals are sent to the RX processing circuitry 219, which generates processed baseband signals by filtering, decoding, and/or digitizing the baseband or IF signals. The RX processing circuitry 219 transmits the processed baseband signals to the controller/processor 224 for further processing.

For each affiliated AP 202a-202n, the TX processing circuitry 214 receives analog or digital data (such as voice data, web data, e-mail, or interactive video game data) from the controller/processor 224. The TX processing circuitry 214 encodes, multiplexes, and/or digitizes the outgoing baseband data to generate processed baseband or IF signals. The RF transceivers 209a-209n receive the outgoing processed baseband or IF signals from the TX processing circuitry 214 and up-convert the baseband or IF signals to RF signals that are transmitted via the antennas 204a-204n. In embodiments wherein each affiliated AP 202a-202n operates at a different bandwidth, e.g., 2.4 GHz, 5 GHz, or 6 GHz, the outgoing RF signals transmitted by each affiliated AP may be at a different frequency of RF.

The controller/processor 224 can include one or more processors or other processing devices that control the overall operation of the AP MLD 101. For example, the controller/processor 224 could control the reception of forward channel signals and the transmission of reverse channel signals by the RF transceivers 209a-209n, the RX processing circuitry 219, and the TX processing circuitry 214 in accordance with well-known principles. The controller/processor 224 could support additional functions as well, such as more advanced wireless communication functions. For instance, the controller/processor 224 could support beam forming or directional routing operations in which outgoing signals from multiple antennas 204a-204n are weighted differently to effectively steer the outgoing signals in a desired direction. The controller/processor 224 could also support OFDMA operations in which outgoing signals are assigned to different subsets of subcarriers for different recipients (e.g., different STAs 111-114). Any of a wide variety of other functions could be supported in the AP MLD 101 by the controller/processor 224 including supporting link negotiation for next generation enhanced multi-link multi-radio operation. In some embodiments, the controller/processor 224 includes at least one microprocessor or microcontroller. The controller/processor 224 is also capable of executing programs and other processes resident in the memory 229, such as an OS. The controller/processor 224 can move data into or out of the memory 229 as required by an executing process.

The controller/processor 224 is also coupled to the backhaul or network interface 234. The backhaul or network interface 234 allows the AP MLD 101 to communicate with other devices or systems over a backhaul connection or over a network. The interface 234 could support communications over any suitable wired or wireless connection(s). For example, the interface 234 could allow the AP MLD 101 to communicate over a wired or wireless local area network or over a wired or wireless connection to a larger network (such as the Internet). The interface 234 includes any suitable structure supporting communications over a wired or wireless connection, such as an Ethernet or RF transceiver. The memory 229 is coupled to the controller/processor 224. Part of the memory 229 could include a RAM, and another part of the memory 229 could include a Flash memory or other ROM.

As described in more detail below, the AP MLD 101 may include circuitry and/or programming for supporting link negotiation for next generation enhanced multi-link multi-radio operation. Although FIG. 2A illustrates one example of AP MLD 101, various changes may be made to FIG. 2A. For example, the AP MLD 101 could include any number of each component shown in FIG. 2A. As a particular example, an AP MLD 101 could include a number of interfaces 234, and the controller/processor 224 could support routing functions to route data between different network addresses. As another particular example, while each affiliated AP 202a-202n is shown as including a single instance of TX processing circuitry 214 and a single instance of RX processing circuitry 219, the AP MLD 101 could include multiple instances of each (such as one per RF transceiver) in one or more of the affiliated APs 202a-202n. Alternatively, only one antenna and RF transceiver path may be included in one or more of the affiliated APs 202a-202n, such as in legacy APs. Also, various components in FIG. 2A could be combined, further subdivided, or omitted and additional components could be added according to particular needs.

Figure 2B:
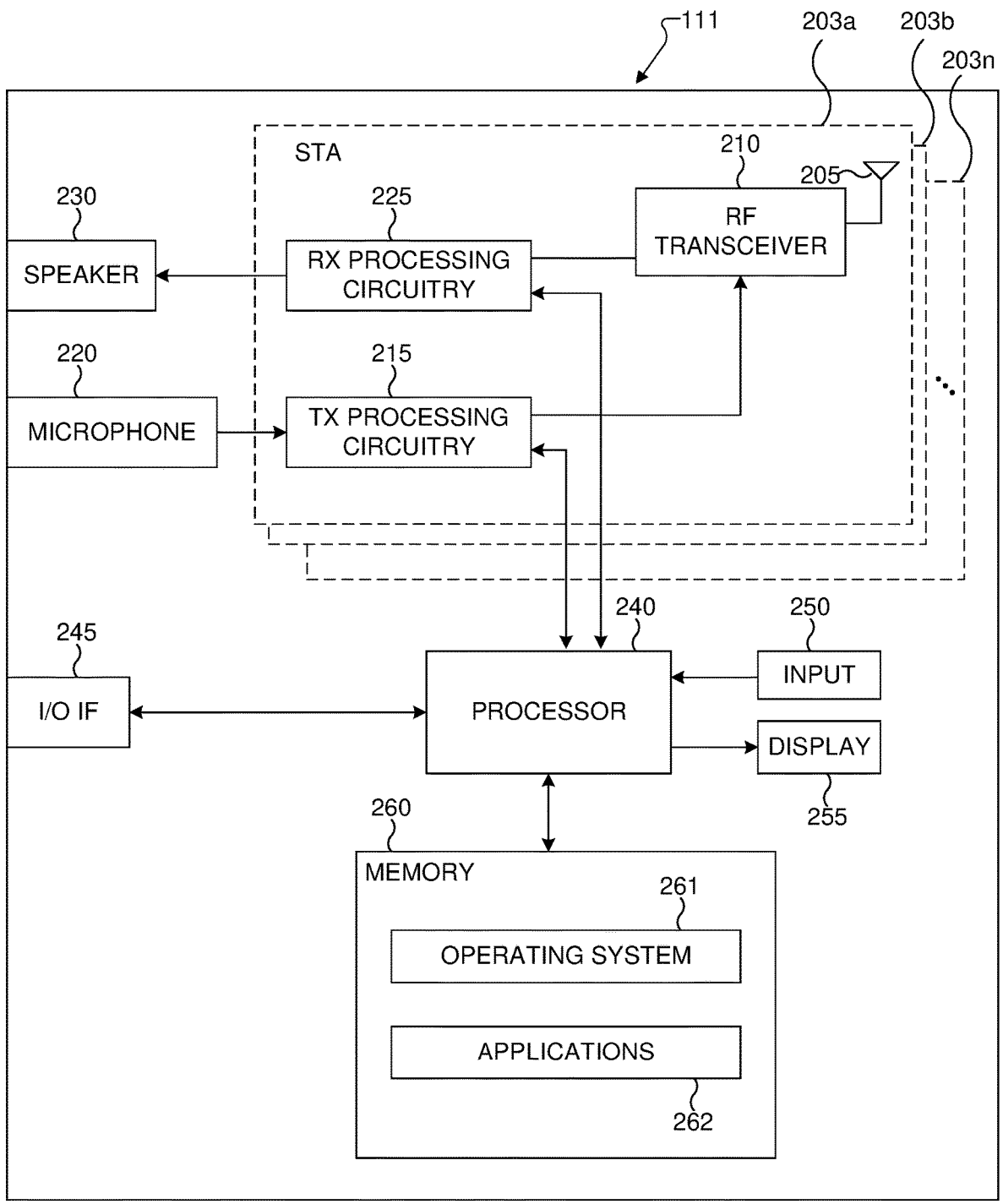
FIG. 2B illustrates an example station (STA) according to various embodiments of the present disclosure.

FIG. 2B illustrates an example STA 111 according to various embodiments of this disclosure. The embodiment of the STA 111 illustrated in FIG. 2B is for illustration only, and the STAs 111-115 of FIG. 1 could have the same or similar configuration. In the embodiments discussed herein below, the STA 111 is a non-AP MLD. However, STAs come in a wide variety of configurations, and FIG. 2B does not limit the scope of this disclosure to any particular implementation of a STA.

The non-AP MLD 111 is affiliated with multiple STAs 203a-203n (which may be referred to, for example, as STA1-STAn). Each of the affiliated STAs 203a-203n includes antenna(s) 205, a radio frequency (RF) transceiver 210, TX processing circuitry 215, and receive (RX) processing circuitry 225. The non-AP MLD 111 also includes a microphone 220, a speaker 230, a controller/processor 240, an input/output (I/O) interface (IF) 245, a touchscreen 250, a display 255, and a memory 260. The memory 260 includes an operating system (OS) 261 and one or more applications 262.

The illustrated components of each affiliated STA 203a-203n may represent a PHY layer and an LMAC layer in the OSI networking model. In such embodiments, the illustrated components of the non-AP MLD 111 represent a single UMAC layer and other higher layers in the OSI model, which are shared by all of the affiliated STAs 203a-203n.

For each affiliated STA 203a-203n, the RF transceiver 210 receives, from the antenna(s) 205, an incoming RF signal transmitted by an AP of the network 100. In some embodiments, each affiliated STA 203a-203n operates at a different bandwidth, e.g., 2.4 GHz, 5 GHz, or 6 GHz, and accordingly the incoming RF signals received by each affiliated STA may be at a different frequency of RF. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the controller/processor 240 for further processing (such as for web browsing data).

For each affiliated STA 203a-203n, the TX processing circuitry 215 receives analog or digital voice data from the microphone 220 or other outgoing baseband data (such as web data, e-mail, or interactive video game data) from the controller/processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna(s) 205. In embodiments wherein each affiliated STA 203a-203n operates at a different bandwidth, e.g., 2.4 GHz, 5 GHz, or 6 GHz, the outgoing RF signals transmitted by each affiliated STA may be at a different frequency of RF.

The controller/processor 240 can include one or more processors and execute the basic OS program 261 stored in the memory 260 in order to control the overall operation of the non-AP MLD 111. In one such operation, the main controller/processor 240 controls the reception of forward channel signals and the transmission of reverse channel signals by the RF transceiver 210, the RX processing circuitry 225, and the TX processing circuitry 215 in accordance with well-known principles. The main controller/processor 240 can also include processing circuitry configured to support link negotiation for next generation enhanced multi-link multi-radio operation. In some embodiments, the controller/processor 240 includes at least one microprocessor or microcontroller.

The controller/processor 240 is also capable of executing other processes and programs resident in the memory 260, such as operations for supporting link negotiation for next generation enhanced multi-link multi-radio operation. The controller/processor 240 can move data into or out of the memory 260 as required by an executing process. In some embodiments, the controller/processor 240 is configured to execute a plurality of applications 262, such as applications for supporting link negotiation for next generation enhanced multi-link multi-radio operation. The controller/processor 240 can operate the plurality of applications 262 based on the OS program 261 or in response to a signal received from an AP. The main controller/processor 240 is also coupled to the I/O interface 245, which provides non-AP MLD 111 with the ability to connect to other devices such as laptop computers and handheld computers. The I/O interface 245 is the communication path between these accessories and the main controller 240.

The controller/processor 240 is also coupled to the touchscreen 250 and the display 255. The operator of the non-AP MLD 111 can use the touchscreen 250 to enter data into the non-AP MLD 111. The display 255 may be a liquid crystal display, light emitting diode display, or other display capable of rendering text and/or at least limited graphics, such as from web sites. The memory 260 is coupled to the controller/processor 240. Part of the memory 260 could include a random-access memory (RAM), and another part of the memory 260 could include a Flash memory or other read-only memory (ROM).

Although FIG. 2B illustrates one example of non-AP MLD 111, various changes may be made to FIG. 2B. For example, various components in FIG. 2B could be combined, further subdivided, or omitted and additional components could be added according to particular needs. In particular examples, one or more of the affiliated STAs 203a-203n may include any number of antenna(s) 205 for MIMO communication with an AP 101. In another example, the non-AP MLD 111 may not include voice communication or the controller/processor 240 could be divided into multiple processors, such as one or more central processing units (CPUs) and one or more graphics processing units (GPUs). Also, while FIG. 2B illustrates the non-AP MLD 111 configured as a mobile telephone or smartphone, non-AP MLDs can be configured to operate as other types of mobile or stationary devices.

The non-AP MLDs in 802.11be can have different capabilities in terms of multi-link operation. The current 802.11be specification defines two special kinds of multi-link operations, namely, Enhanced Multi-Link Single-Radio Operation (EMLSR) and Enhanced Multi-Link Multi-Radio Operation (EMLMR).

Many 802.11be non-AP MLDs may only have a single radio. Enhanced Multi-Link Single Radio (EMLSR) enables a multi-link operation with a single radio. With EMLSR operation, a non-AP MLD can achieve throughput enhancement with reduced latency—a performance close to concurrent dual radio non-AP MLDs. EMLSR operation and the behavior of STAs affiliated with non-AP MLD during EMLSR mode of operation are defined in 802.11be standards. According to current specifications, if a non-AP MLD intends to operate in EMLSR mode with its associated AP MLD, a STA affiliated with the non-AP MLD sends an EML Operating Mode Notification frame to its associated AP affiliated with the AP MLD, where the EMLSR Mode subfield in EML Control field in the EML Operating Mode Notification frame is set to 1. Upon receiving the EML Operating Mode Notification frame from the non-AP MLD, the AP MLD can send, on any enabled link between the AP MLD and the non-AP MLD, another EML Operating Mode Notification frame, where the EMLSR Mode subfield in EML Control field in the EML Operating Mode Notification frame is set to 1. The AP affiliated with the AP MLD is expected to send the EML Operating Mode Notification frame in response to the EML Operating Mode Notification frame sent by an STA affiliated with the non-AP MLD within the timeout interval indicated in the Transition Timeout subfield in EML Capabilities subfield in the Basic Variant Multi-Link element that is most recently exchanged between the AP MLD and the non-AP MLD. The non-AP MLD transitions to EMLSR mode immediately after receiving the EML Operating Mode Notification frame with EMLSR Mode subfield in EML Control field set to 1 from an AP affiliated with the AP MLD or immediately after the timeout interval indicated in the Transition Timeout subfield in EML Capabilities field in the Basic Variant Multi-Link element elapses after the end of last PPDU contained in the EML Operating Mode Notification frame transmitted by the non-AP MLD, whichever occurs first. Upon transitioning into EMLSR mode of operation, all STAs affiliated with the non-AP MLD transition to active mode (listening mode). This process for transitioning into EMLSR mode using the EML Operating Mode Notification frame exchanges is illustrated in FIG. 3.

Figure 3:
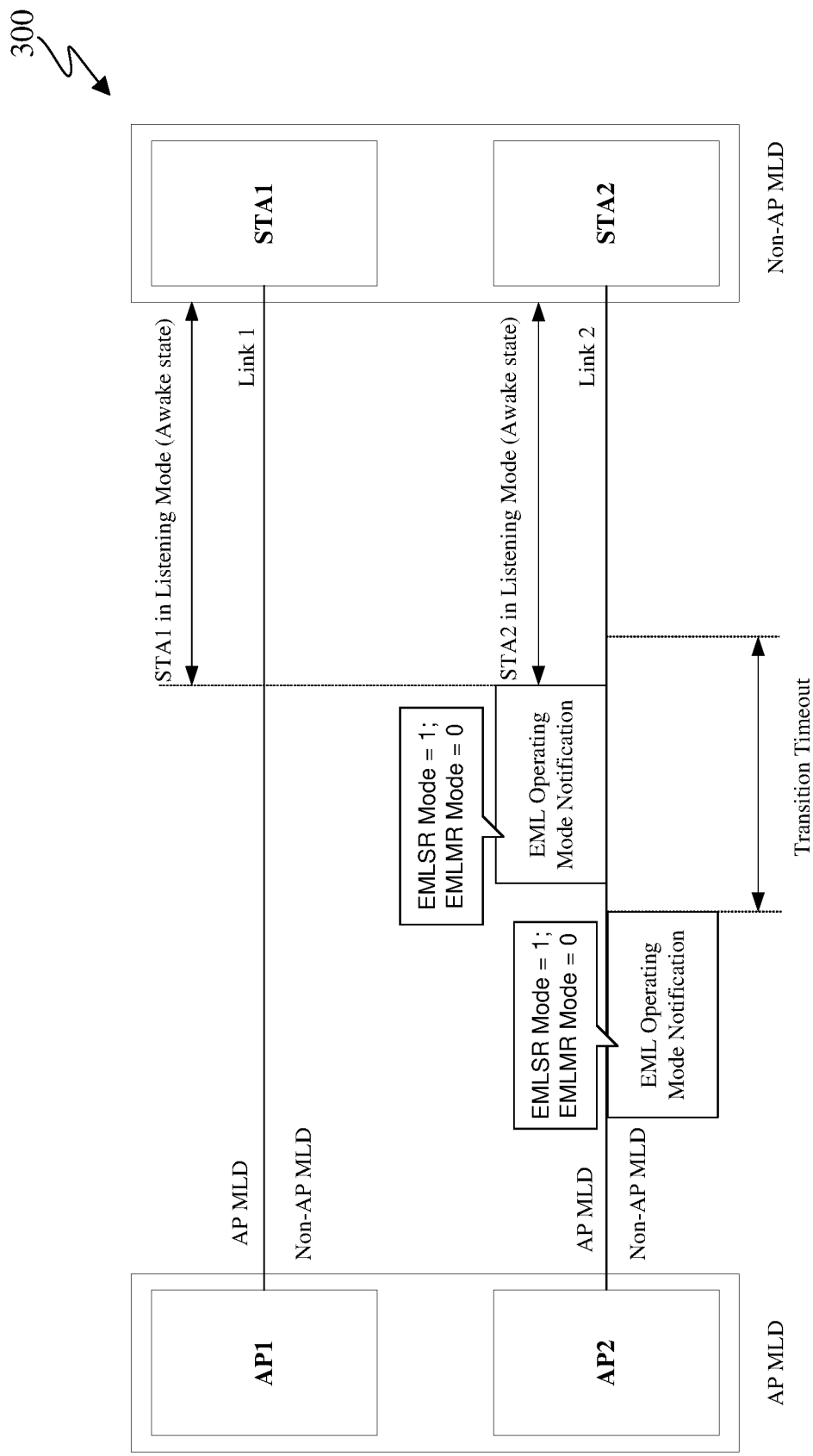
FIG. 3 illustrates the use of an EML Operating Mode Notification frame to transition into EMLSR mode according to embodiments of the present disclosure.

FIG. 3 illustrates the use of an EML Operating Mode Notification frame to transition into EMLSR mode 300 according to embodiments of the present disclosure. The embodiment of the use of an EML Operating Mode Notification frame to transition into EMLSR mode 300 shown in FIG. 3 is for illustration only. Other embodiments of the use of an EML Operating Mode Notification frame to transition into EMLSR mode 300 could be used without departing from the scope of this disclosure.

As illustrated in FIG. 3, AP1 and AP2 are two APs affiliated with the AP MLD. Also, STA1 and STA2 are two non-AP STAs affiliated with the non-AP MLD. Two links are set up between the AP MLD and the non-AP MLD— Link 1 between AP1 and STA1, and Link 2 between AP2 and STA2. Moreover, in this illustration, both Link 1 and Link 2 are enabled links. The non-AP MLD intends to transition to the EMLSR mode, and accordingly, STA2 sends to AP2 over Link 2 an EML Operating Mode Notification frame with the EMLSR Mode subfield in EML Control field set to 1. In response to the EML Operating Mode Notification frame transmitted by the non-AP MLD, AP2 sends to STA2 another EML Operating Mode Notification frame with the EMLSR Mode subfield in the EML Control field set to 1. After receiving the EML Operating Mode Notification frame from the AP MLD, the non-AP MLD transitions into EMLSR mode, and both STA1 and STA2 transition into listening mode.

Enhanced Multi-Link Multi-Radio (EMLMR) operation is another mode of operation newly defined in the IEEE 802.11be specification. With the EMLMR mode of operation, it is possible for a multi-link device with multiple radios to move transmit (TX)/receive (RX) chains from one link (for example, the first link) to another link (for example, the second link) of the same MLD, essentially increasing the spatial stream capability of the second link.

According to the current 802.11be specification, the procedure for a non-AP MLD's transitioning into the EMLMR mode is quite similar to the procedure for transitioning into the EMLSR mode. According to current 802.11be specifications, if a non-AP MLD intends to operate in the EMLMR mode with its associated AP MLD, a STA affiliated with the non-AP MLD sends an EML Operating Mode Notification frame to its associated AP affiliated with the AP MLD, where the EMLMR Mode subfield in the EML Control field in the EML Operating Mode Notification frame is set to 1 (and the EMLSR Mode in the same frame is set to 0). Upon receiving the EML Operating Mode Notification frame from the non-AP MLD, the AP MLD can send, on any enabled link between the AP MLD and the non-AP MLD, another EML Operating Mode Notification frame, where the EMLMR Mode subfield in the EML Control field in the EML Operating Mode Notification frame is set to 1. The AP affiliated with the AP MLD is expected to send the EML Operating Mode Notification frame in response to the EML Operating Mode Notification frame sent by an STA affiliated with the non-AP MLD within the timeout interval indicated in the Transition Timeout subfield in EML Capabilities subfield in the Basic Variant Multi-Link element that is most recently exchanged between the AP MLD and the non-AP MLD. The non-AP MLD transitions to the EMLMR mode immediately after receiving the EML Operating Mode Notification frame with the EMLMR Mode subfield in the EML Control field set to 1 from an AP affiliated with the AP MLD or immediately after the timeout interval indicated in the Transition Timeout subfield in the EML Capabilities field in the Basic Variant Multi-Link element elapses after the end of the last PPDU contained in the EML Operating Mode Notification frame transmitted by the non-AP MLD, whichever occurs first. The following are some of the steps for operating in the EMLMR mode:

After the non-AP MLD transitions into the EMLMR mode, it is the AP MLD that sends the Initial Frame to the non-AP MLD. The subsequent EMLMR frame exchanges occur on the link on which the AP MLD sends the Initial Frame.

According to the current specification, the initial frame can be any frame that is sent by the AP MLD to the non-AP MLD as the first frame after the non-AP MLD transitions into the EMLMR mode.

According to the current specification, the AP MLD, for EMLMR frame exchanges, shall select one of the links that are included as the EMLMR links.

After the AP MLD sends the initial frame on a link, the non-AP MLD is able to operate on that link with maximum spatial stream as indicated by the values in the EMLMR Rx NSS and EMLMR Tx NSS subfields in the EML Capabilities subfield of the Common Info field of the Basic Multi-Link element.

Immediately after the EMLMR frame exchange sequence is complete, the STAs affiliated with the AP MLD go back to operate with the per-link spatial stream capability.

Figure 4:
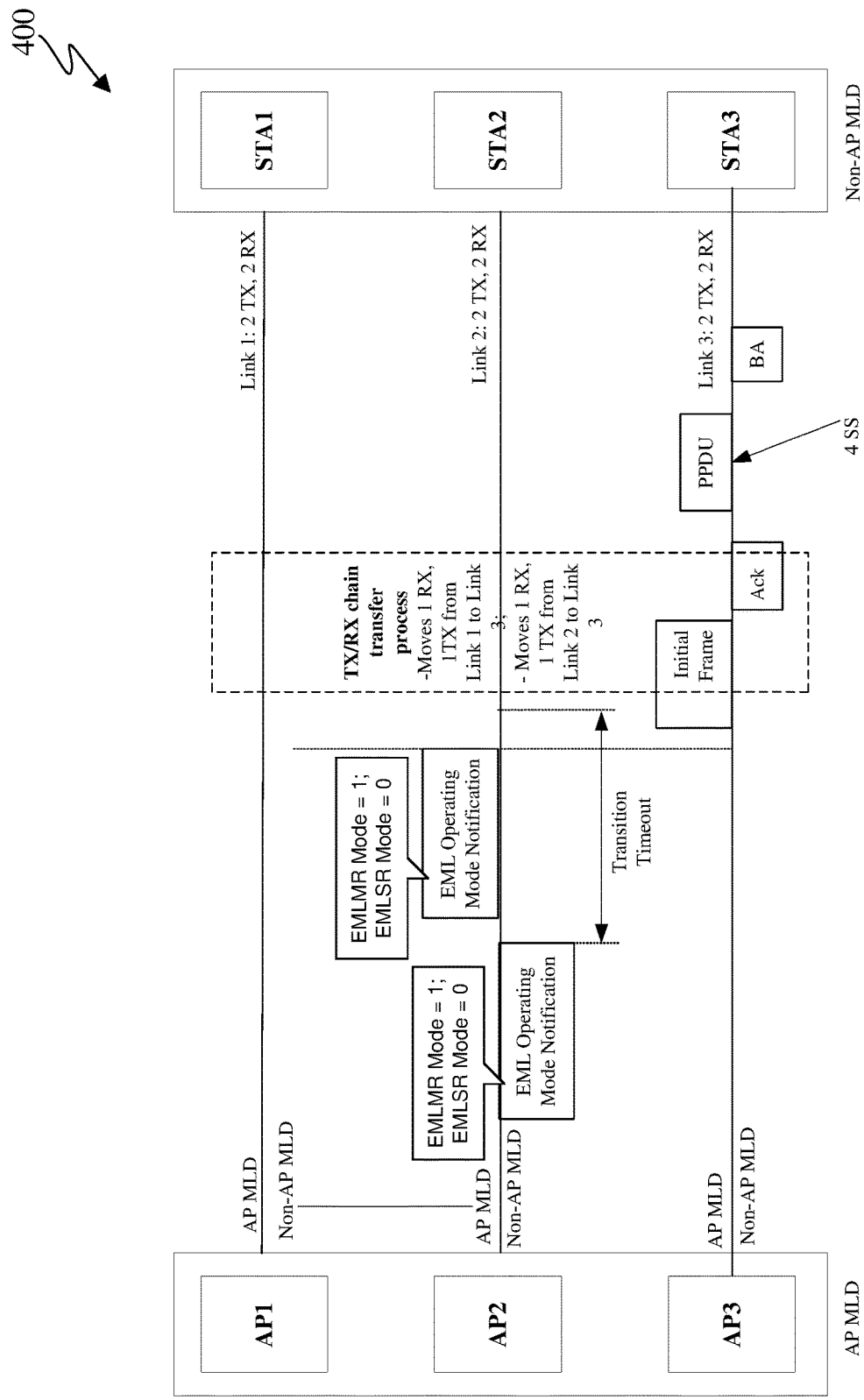
FIG. 4 illustrates an example of a procedure for the EMLMR mode of operation according to embodiments of the present disclosure.

FIG. 4 illustrates an example of a procedure for the EMLMR mode of operation 400 according to embodiments of the present disclosure. The embodiment of the procedure for the EMLMR mode of operation 400 shown in FIG. 4 is for illustration only. Other embodiments of the procedure for the EMLMR mode of operation 400 could be used without departing from the scope of this disclosure.

As illustrated in FIG. 4, the AP MLD has three affiliated APs: AP1 operating on the 2.4 GHz band, AP2 operating on the 5 GHz band, and AP3 operating on the 6 GHz band. The non-AP MLD has three affiliated STAs: STA1 operating on the 2.4 GHz band, STA2 operating on the 5 GHz band, and STA3 operating on the 6 GHz band. Three links are established between the AP MLD and the non-AP MLD: Link 1 between AP1 and STA1, Link 2 between AP2 and STA2, and Link 3 between AP3 and STA3. The non-AP MLD is a multi-radio non-AP MLD, where STA1, STA2, and STA3 each have two transmit chains and two receive chains. Both the AP MLD and the non-AP MLD support the EMLMR mode of operation. The non-AP MLD lists all three links, Link 1, Link 2, and Link 3, as the EMLMR links. In the Basic Multi-Link element exchanged between the AP MLD and the non-AP MLD, the EML Capabilities Present subfield is set to 1, and both the EMLMR Rx NSS and EMLME Tx NSS subfields in the EML Capabilities subfield is set to the value of 4. At one point of time of operation, the non-AP MLD intends to enter into the EMLMR mode and sends an EML Operating Mode Notification frame to the AP MLD on Link 2. In that EML Operating Mode Notification frame, the EMLMR Mode subfield in the EML Control field is set to 1 and the EMLSR Mode subfield in the EML Control field is set to 0. Upon receiving the EML Operating Mode Notification frame on Link 2, AP2 affiliated with the AP MLD sends, in response, another EML Operating Mode Notification frame to the non-AP MLD on Link 2 and sets the EMLMR Mode subfield in the EML Control field to 1 and the EMLSR Mode subfield in the EML Control field to 0 in the EML Operating Mode Notification frame.

Upon receiving the EML Operating Mode Notification frame from the AP MLD, which is transmitted before the timeout timer indicated in the Transition Timeout subfield in the EML Capabilities subfield in the Basic Multi-Link element expires, the non-AP MLD transitions into the EMLMR mode. After the non-AP MLD transitions into EMLMR mode, the AP MLD sends the initial frame on Link 3 to initiate the frame exchanges for EMLMR operation. Upon receiving the initial frame on Link 3, the non-AP MLD—

Transfers 1 transmit chain and 1 receive chain from Link 1 to Link 3

Transfers 1 transmit chain and 1 receive chain from Link 2 to Link 3.

After the transmit and receive chain transfer process is complete, Link 3 now has 4 transmit chains and 4 receive chains. Therefore, STA3 affiliated with the non-AP MLD can now perform transmit and receive operation using 4 spatial streams on Link 3, in accordance with the value set in the EMLMR Rx NSS and EMLMR Tx NSS subfields in the EML Capabilities subfield of the Basic Multi-link element. STA 3 affiliated with the non-AP MLD then sends an Ack frame in response to the initial control frame sent by the AP MLD. Accordingly, the AP MLD performs subsequent PPDU transmission to the non-AP MLD on Link 3 using 4 spatial streams.

Various embodiments of the present disclosure recognize that for the EMLMR mode of operation, after the non-AP MLD transitions into the EMLMR mode, by exchanging the EML Operating Mode Notification frame with the associated AP MLD over any enabled link between the AP MLD and the non-AP MLD such that the EMLMR Mode subfield in the EML Control field of the exchanged EML Operating Mode Notification frame is set to 1, the AP MLD sends the initial frame to initiate the EMLMR frame exchanges on any EMLMR links. The subsequent EMLMR frame exchanges occur on the link on which the AP MLD sends the Initial Frame.

Various embodiments of the present disclosure recognize that based on the current 802.11be specification, the EMLMR links are non-negotiable (similar to EMLSR links)—the AP MLD when sending the EML Operating Mode Notification frame to a non-AP MLD in response to the EML Operating Mode Notification frame received from the non-AP MLD sets the same set of parameters in the response frame as that of the EML Operating Mode Notification frame received from the non-AP MLD.

Various embodiments of the present disclosure recognize that the AP MLD may not have same capability to operate with the maximum TX/RX streams on all the links included in the EMLMR links as indicated by the non-AP MLD. Currently, no mechanism is defined in the 802.11be specification that would enable a negotiation of EMLMR links between an AP MLD and a non-AP MLD before operating in the EMLMR mode.

Accordingly, various embodiments of the present disclosure provide mechanisms and frameworks for EMLMR links negotiation between an AP MLD and a non-AP MLD supporting the EMLMR mode of operation. For example, various embodiments of the present disclosure provide a mechanism that allows the AP MLD to reject an EMLMR mode transition request made by the non-AP MLD, and to let the non-AP MLD submit a new request with a different set of EMLMR links. Various embodiments of the present disclosure provide a mechanism that allows the AP MLD to suggest a different set of EMLMR links if it cannot accept the EMLMR mode transition request made by the non-AP MLD. Various embodiments of the present disclosure provide a mechanism that allows the AP MLD to suggest a subset of EMLMR links in accepting the EMLMR mode transition request made by the non-AP MLD.

Figure 5:
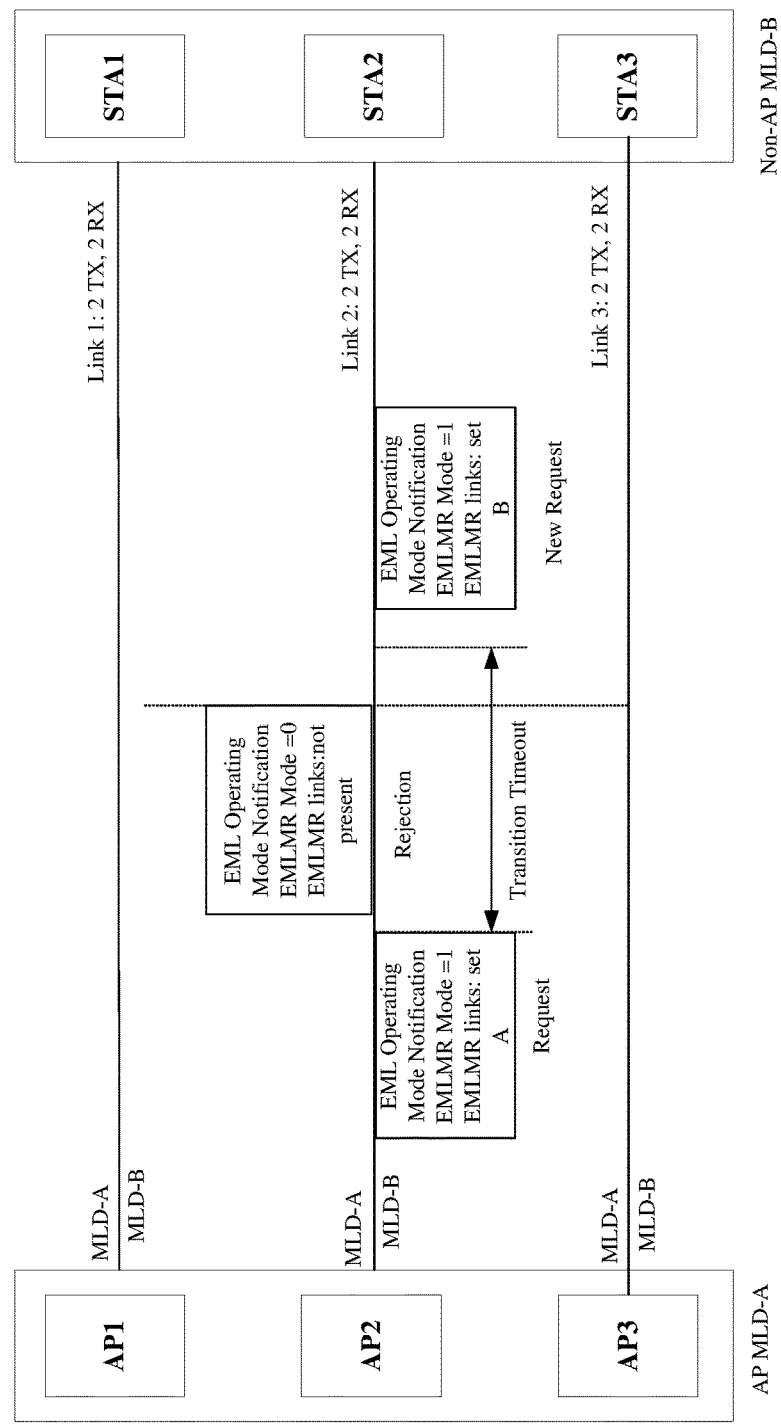
FIG. 5 illustrates an example of rejection of a request for transitioning into the EMLMR mode according to embodiments of the present disclosure.

FIG. 5 illustrates an example of rejection of a request for transitioning into the EMLMR mode 500 according to embodiments of the present disclosure. The embodiment of the rejection of a request for transitioning into the EMLMR mode 500 shown in FIG. 5 is for illustration only. Other embodiments of the rejection of a request for transitioning into the EMLMR mode 500 could be used without departing from the scope of this disclosure.

According to one embodiment, when a non-AP MLD intends to transition into the EMLMR mode and sends an EML Operating Mode Notification frame to its associated AP MLD indicating the EMLMR links and setting the EMLMR Mode subfield to 1, if the AP MLD is not able to operate on EMLMR mode on any of the EMLMR links indicated in the EML Operating Mode Notification frame received from the non-AP MLD, then the AP MLD can reject the EMLMR mode transition request made by the non-AP MLD.

According to one embodiment, the AP MLD can indicate the rejection of the EMLMR mode transition request by sending an EML Operating Mode Notification frame, as a response, to the non-AP MLD with EMLMR Mode subfield set to 0.

According to one embodiment, in order to indicate the rejection of the EMLMR mode transition request made by the non-AP MLD, the AP MLD sends the EML Operating Mode Notification frame with the EMLMR Mode subfield set to 0 to the requesting non-AP MLD before the timeout timer indicated in the Transition Timeout subfield in the EML Capabilities subfield in the Basic Multi-Link element expires. Upon receiving the EML Operating Mode Notification frame with the EMLMR Mode subfield set to 0 from the AP MLD, the non-AP MLD is notified about the rejection of its request to transition in EMLMR mode. The non-AP MLD can subsequently send another EML Operating Mode Notification frame to the to the AP MLD with a different set of EMLMR links and with the EMLMR Mode subfield set to 1. This can be regarded as a new request to transition into the EMLMR mode. FIG. 5 illustrates this embodiment.

Figure 6:
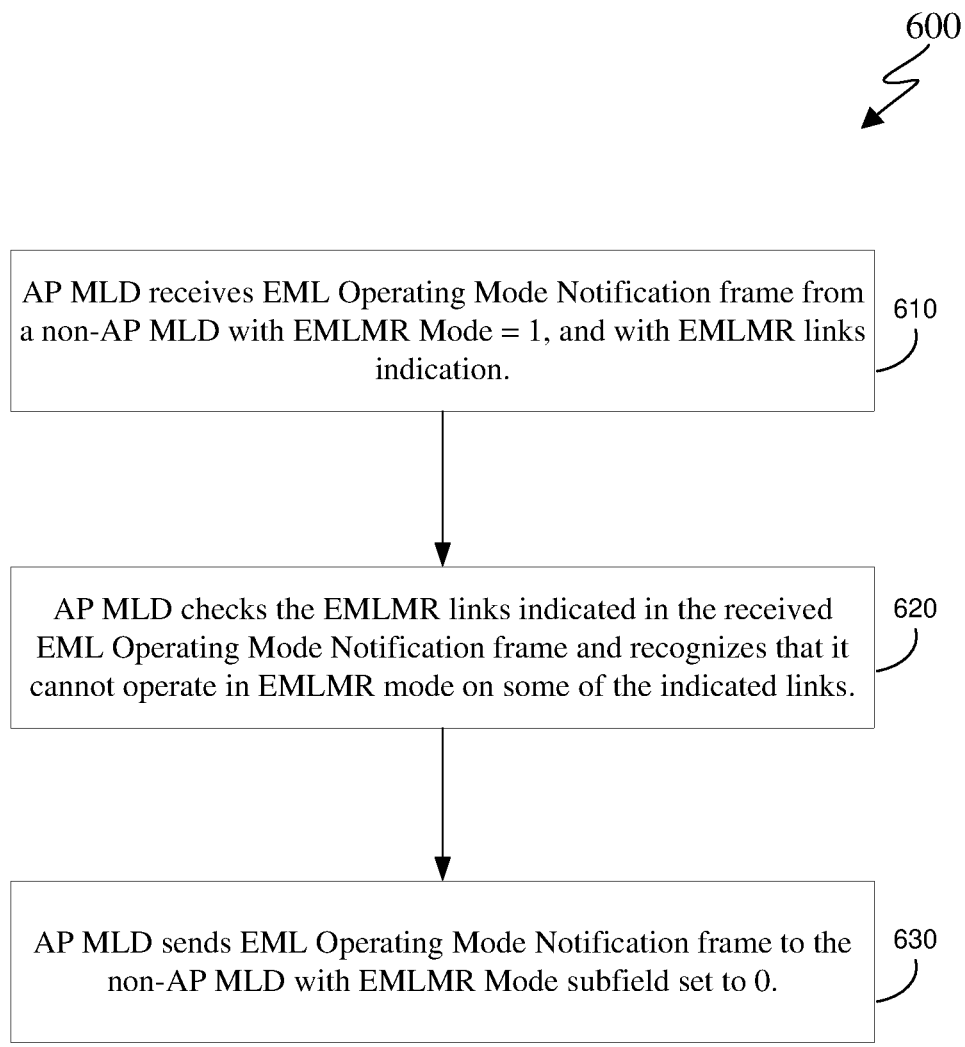
FIG. 6 illustrates a flowchart of an example method performed by the AP MLD of a rejection of a request for transitioning into the EMLMR mode according to embodiments of the present disclosure.

FIG. 6 illustrates a flowchart of an example method 600 performed by the AP MLD of a rejection of a request for transitioning into the EMLMR mode according to embodiments of the present disclosure. The embodiment of the example method 600 performed by the AP MLD of a rejection of a request for transitioning into the EMLMR mode shown in FIG. 6 is for illustration only. Other embodiments of the example method 600 performed by the AP MLD of a rejection of a request for transitioning into the EMLMR mode could be used without departing from the scope of this disclosure.

As illustrated in FIG. 6, the method 600 begins at step 610, where the AP MLD receives an EML Operating Mode Notification frame from a non-AP MLD with EMLMR mode=1, and with EMLMR links indication. At step 620, the AP MLD checks the EMLMR links indicated in the received EML Operating Mode Notification frame and recognizes that it cannot operate in the EMLMR mode on some of the indicated links. At step 630, the AP MLD sends and EML Operating Mode Notification frame to the non-AP MLD with the EMLMR subfield set to 0.

Figure 7:
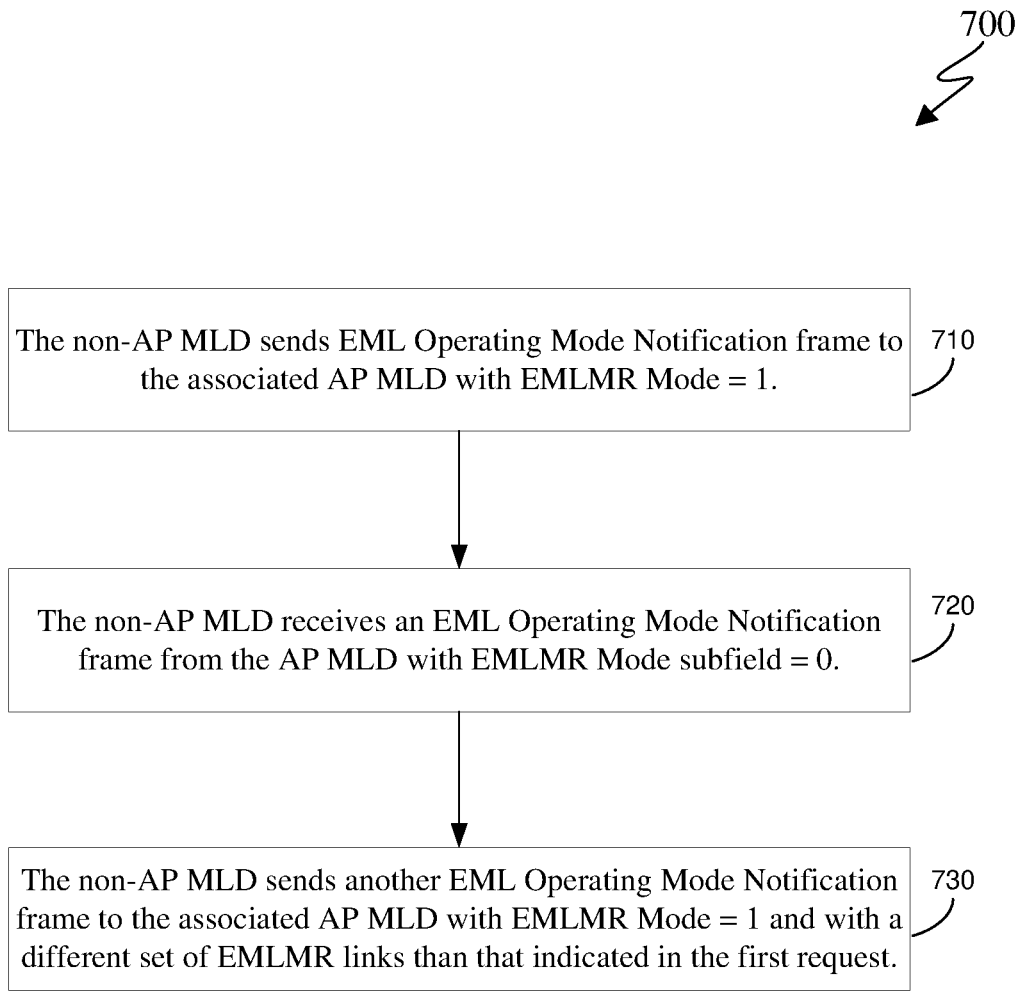
FIG. 7 illustrates a flowchart of an example method performed by the non-AP MLD of a request for transitioning into the EMLMR mode according to embodiments of the present disclosure.

FIG. 7 illustrates a flowchart of an example method 700 performed by the non-AP MLD of a request for transitioning into the EMLMR mode according to embodiments of the present disclosure. The embodiment of the example method 700 performed by the non-AP MLD of a request for transitioning into the EMLMR mode shown in FIG. 7 is for illustration only. Other embodiments of the example method 700 performed by the non-AP MLD of a request for transitioning into the EMLMR mode could be used without departing from the scope of this disclosure.

As illustrated in FIG. 7, the method 700 begins at step 710, where the non-AP MLD sends an EML Operating Mode Notification frame to the associated AP MLD with the EMLMR mode=1. At step 720, the non-AP MLD receives an EML Operating Mode Notification frame from the AP MLD with the EMLMR Mode subfield=0. At step 730, the non-AP MLD sends another EML Operating Mode Notification frame to the associated AP MLD with EMLMR Mode=1 and with a different set of EMLMR links than that indicated in the first request.

Figure 8:
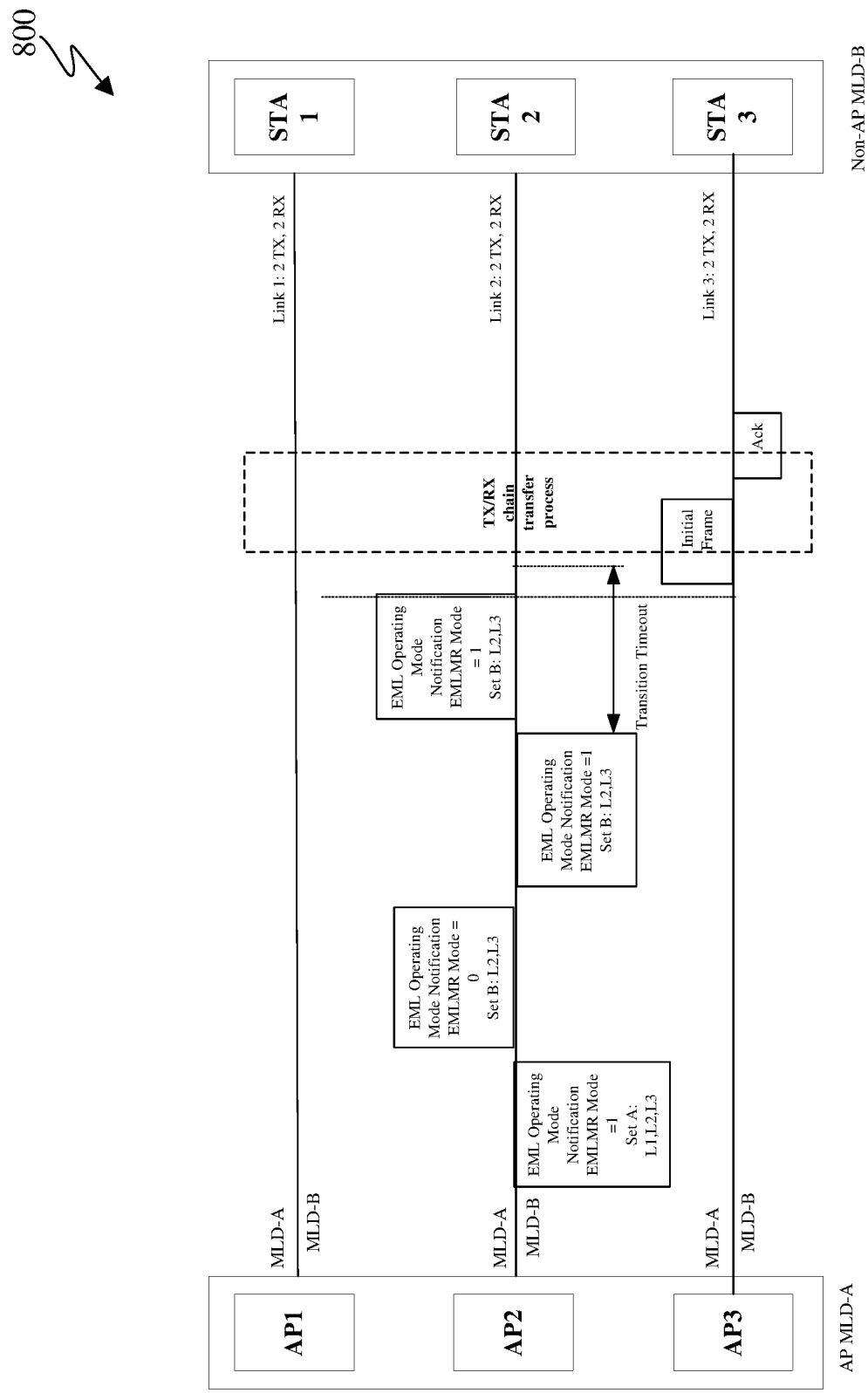
FIG. 8 illustrates an example of an alternative EMLMR links suggestion by the AP MLD according to embodiments of the present disclosure.

FIG. 8 illustrates an example of an alternative EMLMR links suggestion by the AP MLD 800 according to embodiments of the present disclosure. The embodiment of the example alternative EMLMR links suggestion by the AP MLD 800 shown in FIG. 8 is for illustration only. Other embodiments of the example alternative EMLMR links suggestion by the AP MLD 800 could be used without departing from the scope of this disclosure.

According to one embodiment, when an AP MLD receives an EML Operating Mode Notification frame from an associated non-AP MLD with the EMLMR Mode subfield set to 1 with EMLMR links indication with link set A, if the AP MLD is unable to operate in the EMLMR mode with the non-AP MLD on any of the EMLMR links indicated in the received EML Operating Mode Notification frame, then the AP MLD can suggest an alternative set of EMLMR links for EMLMR mode operation with the non-AP MLD. According to one embodiment, the AP MLD can make the suggestion to the non-AP MLD by including its preferred set of links (for example, link set B) as EMLMR links in the EML Operating Mode Notification frame as a response to the EML Operating Mode Notification frame received from the non-AP MLD. In the EML Operating Mode Notification frame sent by the AP MLD as the response frame, the AP MLD can set the EMLMR Mode subfield to 0. This indicates that the current request for EMLMR transition is declined but if the non-AP MLD sends another request by sending another EML Operating Mode Notification frame with the link suggested by the AP MLD (link set B) as EMLMR links, then it is likely that the AP MLD will accept the request by sending the EML Operating Mode Notification frame as a response with the EMLMR Mode subfield set to 1. FIG. 8 illustrates this embodiment.

Figure 9:
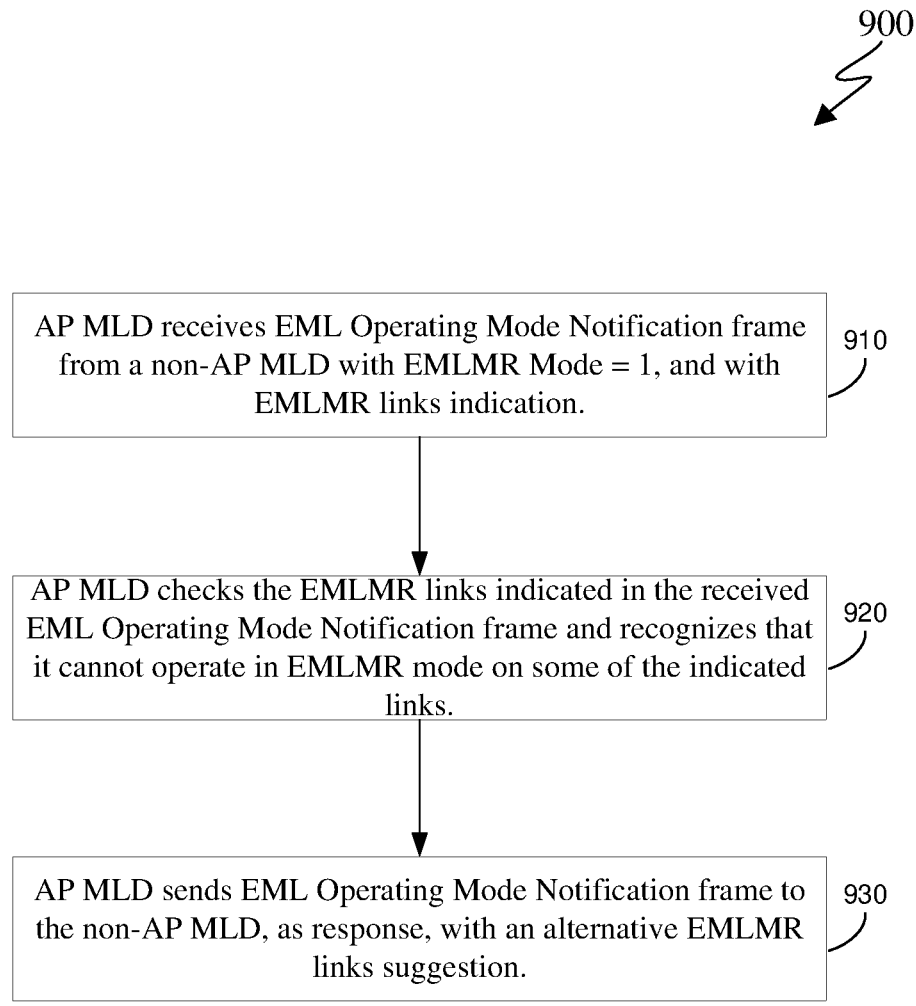
FIG. 9 illustrates an example flowchart of a method performed by the AP MLD for suggesting alternative EMLMR links according to embodiments of the present disclosure.

FIG. 9 illustrates an example flowchart of a method 900 performed by the AP MLD for suggesting alternative EMLMR links according to embodiments of the present disclosure. The embodiment of the example method 900 performed by the AP MLD for suggesting alternative EMLMR links shown in FIG. 9 is for illustration only. Other embodiments of the example method 900 performed by the AP MLD for suggesting alternative EMLMR links could be used without departing from the scope of this disclosure.

As illustrated in FIG. 9, the method 900 begins at step 910, where the AP MLD receives an EML Operating Mode Notification frame from a non-AP MLD with EMLMR Mode=1, and with EMLMR links indication. At step 920, the AP MLD checks the EMLMR links indicated in the received EML Operating Mode Notification frame and recognizes that it cannot operate in the EMLMR mode on some of the indicated links. At step 930, the AP MLD sends an EML Operating Mode Notification frame to the non-AP MLD as a response, with an alternative EMLMR links suggestion.

Figure 10:
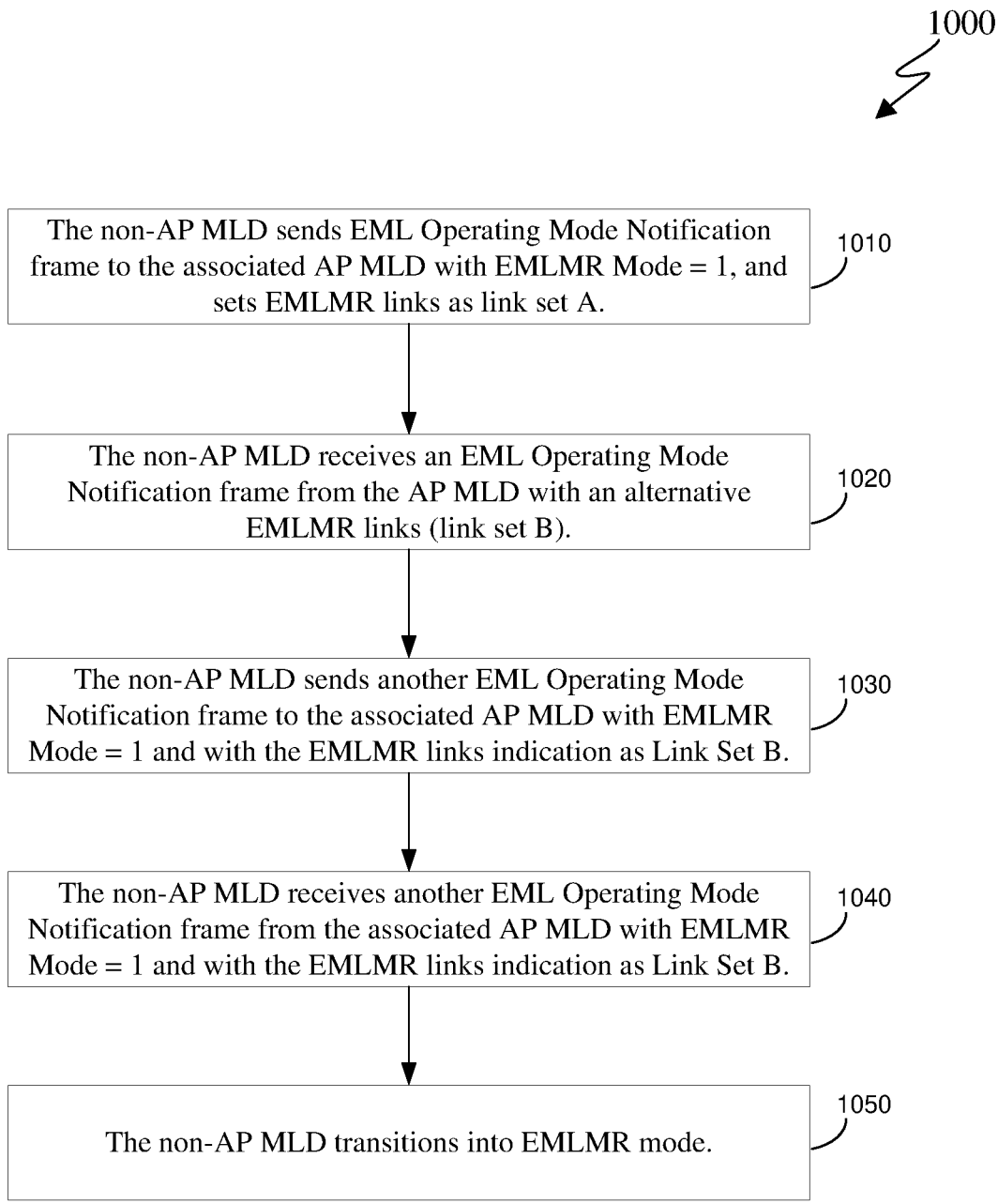
FIG. 10 illustrates an example flowchart of a method performed by the non-AP MLD for sending an EMLMR mode transition request based on EMLMR links suggested by the AP MLD according to embodiments of the present disclosure.

FIG. 10 illustrates an example flowchart of a method 1000 performed by the non-AP MLD for sending an EMLMR mode transition request based on EMLMR links suggested by the AP MLD according to embodiments of the present disclosure. The embodiment of the example method 1000 performed by the non-AP MLD for sending an EMLMR mode transition request based on EMLMR links suggested by the AP MLD shown in FIG. 10 is for illustration only. Other embodiments of the example method 1000 performed by the non-AP MLD for sending an EMLMR mode transition request based on EMLMR links suggested by the AP MLD could be used without departing from the scope of this disclosure.

As illustrated in FIG. 10, the method 1000 begins at step 1010, where the non-AP MLD sends an EML Operating Mode Notification frame to the associated AP MLD with EMLMR=1, and sets EMLMR links as link set A. At step 1020, the non-AP MLD receives an EML Operating Mode Notification frame from the AP MLD with an alternative EMLMR links (link set B). At step 1030, the non-AP MLD sends another EML Operating Mode Notification frame to the associated AP MLD with EMLMR Mode=1, and with the EMLMR links indication as link set B. At step 1040, the non-AP MLD receives another EML Operating Mode Notification frame from the associated AP MLD with EMLMR Mode=1, and with the EMLMR links indication as link set B. At step 1050, the non-AP MLD transitions into EMLMR mode.

According to one embodiment, if the EMLMR links indicated in an EML Operating Mode Notification frame as the response frame transmitted by an AP MLD is different from the EMLMR links indicated in an EML Operating Mode Notification frame as the request frame transmitted by an associated non-AP MLD, then it serves as an indication that the current EMLMR mode transition request is declined.

According to one embodiment, even if the EMLMR Mode subfield in the EML Operating Mode Notification frame as response frame is set to 0, the EMLMR links subfield can be present in the response EML Operating Mode Notification frame. This can indicate that current EMLMR mode transition request is rejected and the EMLMR links in the response frame indicates the alternative EMLMR links suggested by the AP MLD.

According to one embodiment, when an AP MLD sends an EML Operating Mode Notification frame to an associated non-AP MLD in response to a received EML Operating Mode Notification frame from the non-AP MLD, if the AP MLD sets the EMLMR Mode subfield to 1 in the response frame, then the EMLMR links indication is not present in the response EML Operating Mode Notification frame. According to another embodiment, if the AP MLD sets the EMLMR Mode subfield to 1 in the response frame, then the EMLMR links indication is present in the response EML Operating Mode Notification frame and the EMLMR links indicated in the response EML Operating Mode Notification frame is the same as that of request EML Operating Mode Notification frame from the non-AP MLD (e.g., as in the example shown in FIG. 8).

Figure 11:
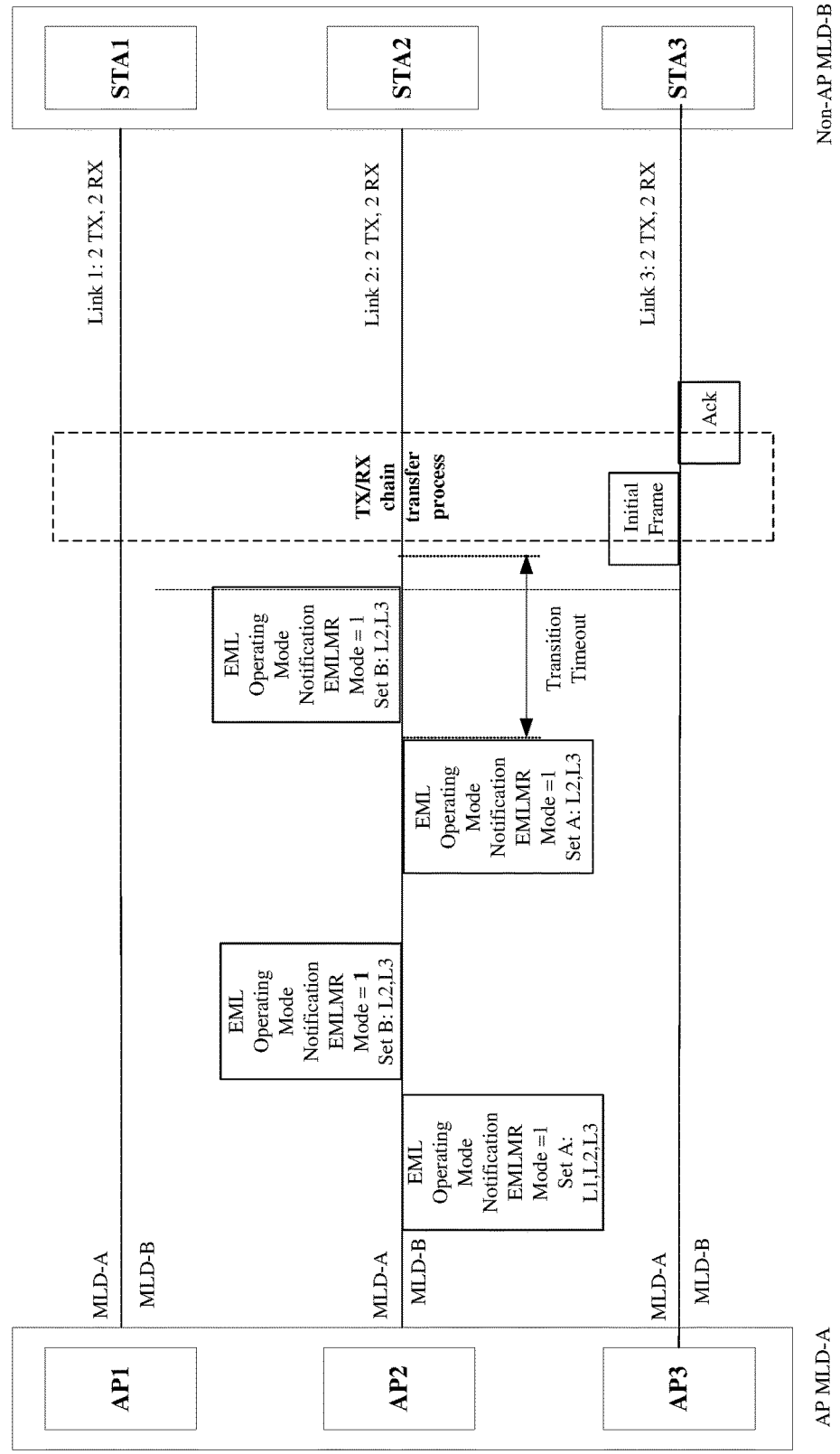
FIG. 11 illustrates an example of link negotiation by suggesting an alternative link set according to embodiments of the present disclosure.

FIG. 11 illustrates an example of link negotiation by suggesting an alternative link set 1100 according to embodiments of the present disclosure. The embodiment of the example of link negotiation by suggesting an alternative link set 1100 shown in FIG. 11 is for illustration only. Other embodiments of the example of link negotiation by suggesting an alternative link set 1100 could be used without departing from the scope of this disclosure.

As illustrated in FIG. 11, according to one embodiment, when an AP MLD sends an EML Operating Mode Notification frame to an associated non-AP MLD in response to a received EML Operating Mode Notification frame from the non-AP MLD, if the AP MLD sets the EMLMR Mode subfield to 1 in the response frame, then the EMLMR links indicated in the response EML Operating Mode Notification frame can be different from the EMLMR links indicated in the request EML Operating Mode Notification frame—it may indicate that the EMLMR mode transition negotiation is not complete yet and if the non-AP MLD sends another EML Operating Mode Notification frame with the EMLMR links indicated by the AP MLD, then the EMLMR mode transition request is likely to be accepted subsequently.

Figure 12:
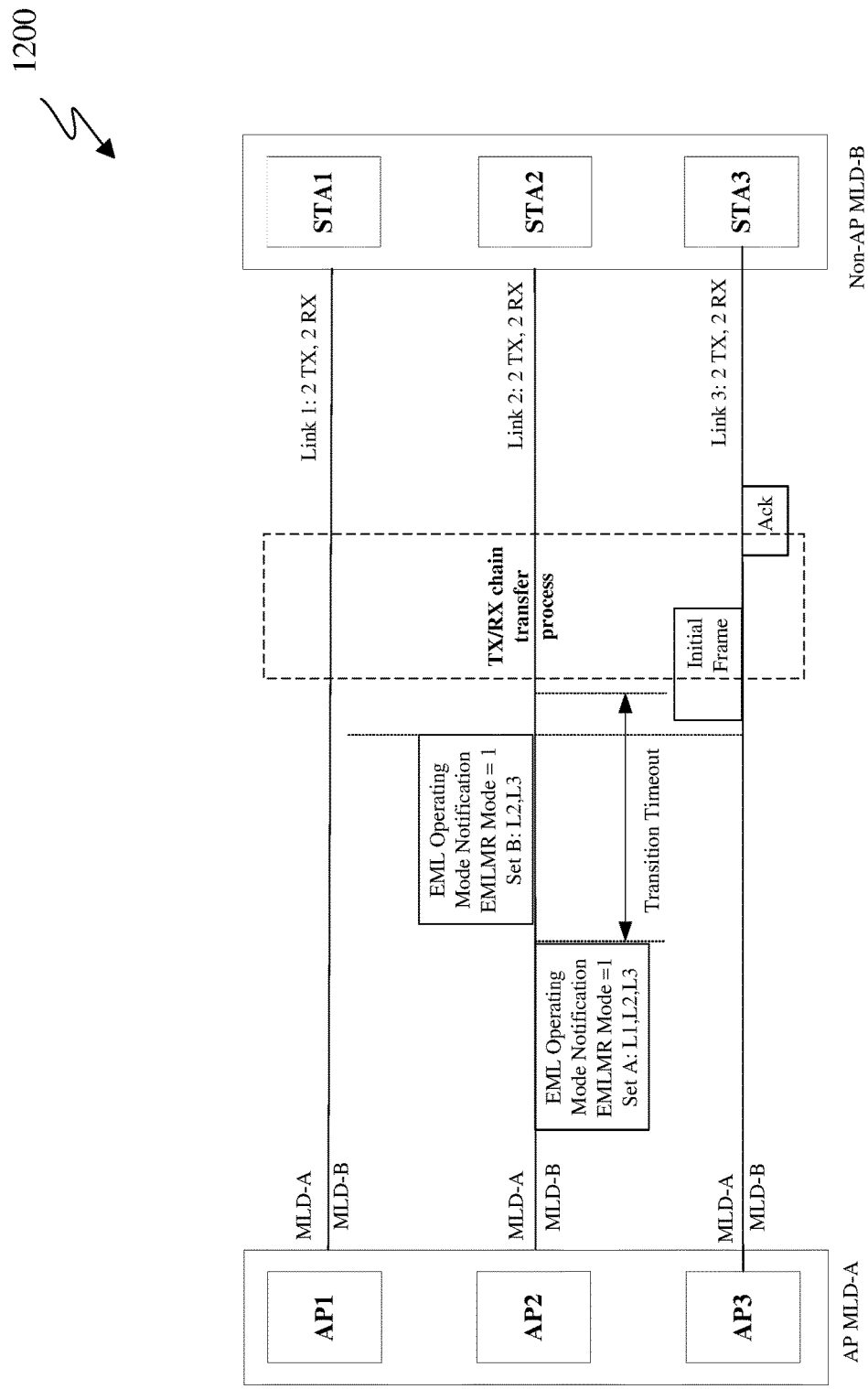
FIG. 12 illustrates an example of EMLMR links in a response frame as a subset of requested EMLMR links according to embodiments of the present disclosure.

FIG. 12 illustrates an example of EMLMR links in a response frame as a subset of requested EMLMR links 1200 according to embodiments of the present disclosure. The embodiment of the example of EMLMR links in a response frame as a subset of requested EMLMR links 1200 shown in FIG. 12 is for illustration only. Other embodiments of the example of EMLMR links in a response frame as a subset of requested EMLMR links 1200 could be used without departing from the scope of this disclosure.

As illustrated in FIG. 12, according to one embodiment, when an AP MLD receives an EML Operating Mode Notification frame from an associated non-AP MLD with the EMLMR Mode subfield set to 1 with EMLMR links indication with link set A, the AP MLD can respond by sending another EML Operating Mode Notification frame to the non-AP MLD with EMLMR Links indication with link set B, where link set B is a subset of link set A. This would indicate that the request for transitioning into EMLMR mode has been accepted but the EMLMR mode will be operating on EMLMR Links of link set B. According to one embodiment, in the response frame, the AP MLD can set the EMLMR Mode subfield to 1.

Figure 13:
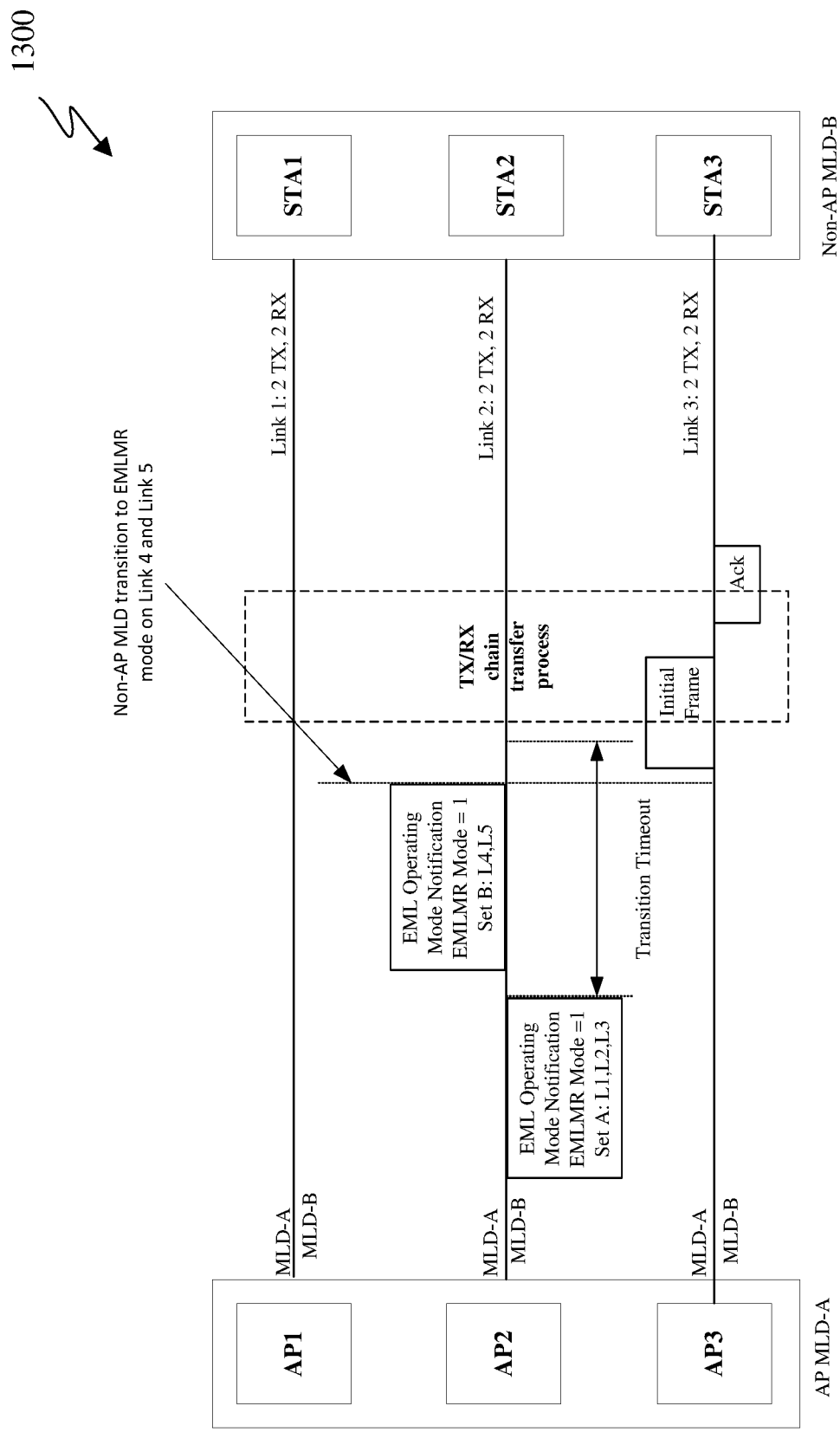
FIG. 13 illustrates an example of EMLMR mode transition on the links dictated by the AP MLD according to embodiments of the present disclosure.

FIG. 13 illustrates an example of EMLMR mode transition on the links dictated by the AP MLD 1300 according to embodiments of the present disclosure. The embodiment of the example of EMLMR mode transition on the links dictated by the AP MLD 1300 shown in FIG. 13 is for illustration only. Other embodiments of the example of EMLMR mode transition on the links dictated by the AP MLD 1300 could be used without departing from the scope of this disclosure.

As illustrated in FIG. 13, according to one embodiment, when an AP MLD receives an EML Operating Mode Notification frame from an associated non-AP MLD with EMLMR Mode subfield set to 1 and with EMLMR links indication as link set A, the AP MLD can send in response an EML Operating Mode Notification frame to the associated non-AP MLD with EMLMR Mode subfield set to 1 and EMLMR links indication as link set B even if link set B is not a subset of link set A. According to this embodiment, the non-AP MLD still transitions into EMLMR mode but operates on link set B as EMLMR links.

Figure 14:
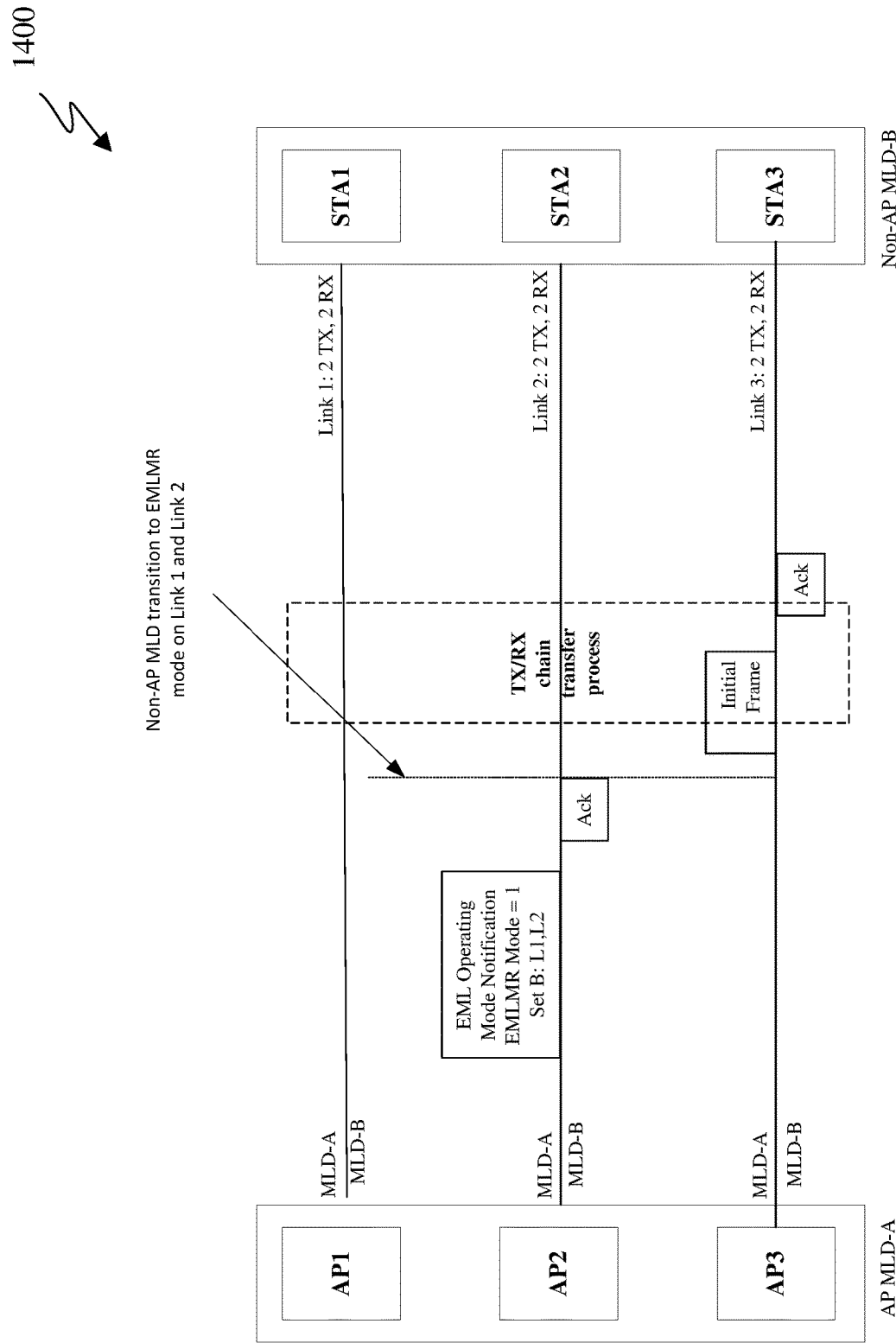
FIG. 14 illustrates an example of transitioning in the EMLMR mode initiated by the unsolicited response from the AP MLD according to embodiments of the present disclosure.

FIG. 14 illustrates an example of transitioning in the EMLMR mode initiated by the unsolicited response from the AP MLD 1400 according to embodiments of the present disclosure. The embodiment of the example of transitioning in the EMLMR mode initiated by the unsolicited response from the AP MLD 1400 shown in FIG. 14 is for illustration only. Other embodiments of the example of transitioning in the EMLMR mode initiated by the unsolicited response from the AP MLD 1400 could be used without departing from the scope of this disclosure.

As illustrated in FIG. 14, according to one embodiment, the AP MLD can send the EML Operating Mode Notification frame to its associated non-AP MLD as an unsolicited response. Upon receiving this unsolicited response, the non-AP MLD may transition into the EMLMR mode and operate on the EMLMR links as indicated in the unsolicited response frame.

Figure 15:
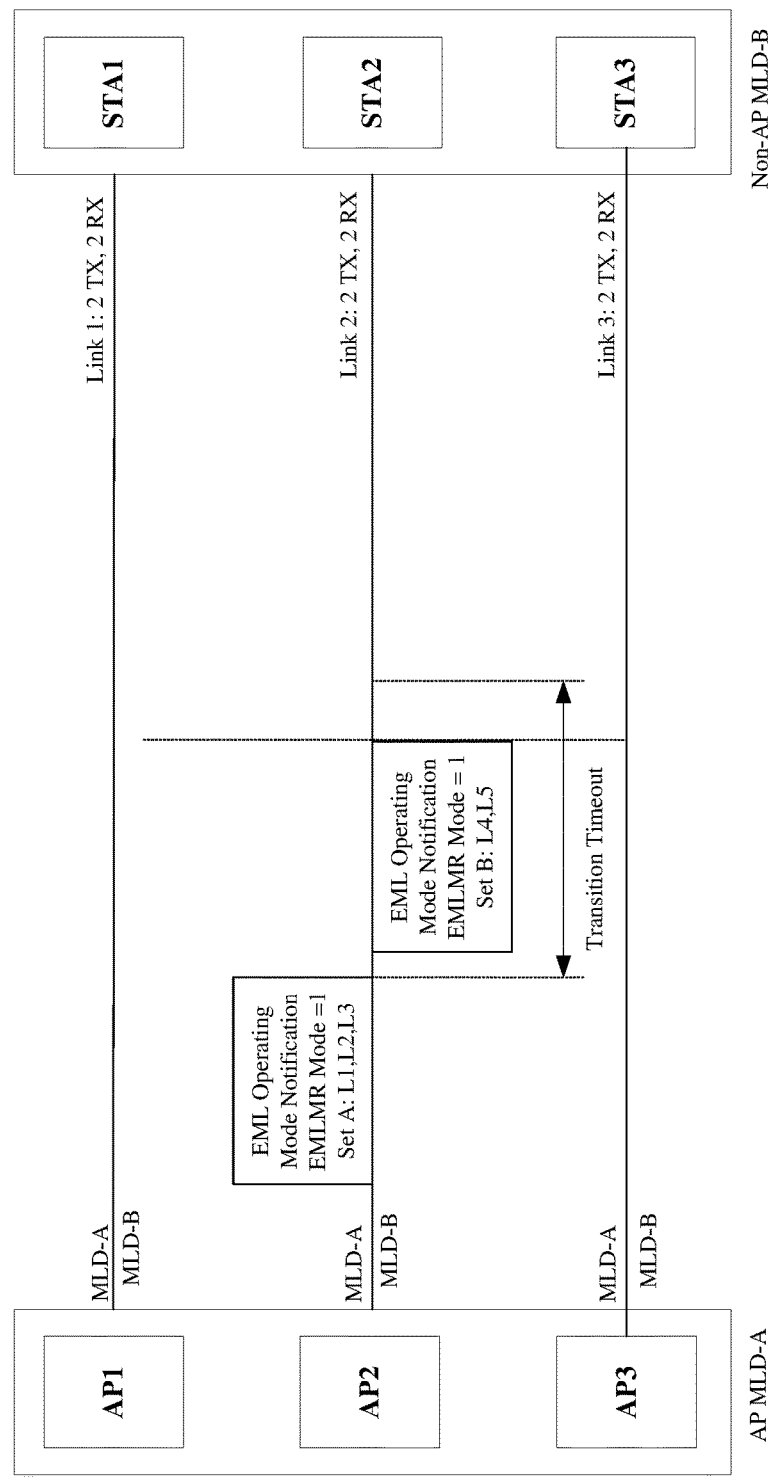
FIG. 15 illustrates an example of an EMLMR transition request initiated by the AP MLD according to embodiments of the present disclosure.

FIG. 15 illustrates an example of an EMLMR transition request initiated by the AP MLD 1500 according to embodiments of the present disclosure. The embodiment of the example of an EMLMR transition request initiated by the AP MLD 1500 shown in FIG. 15 is for illustration only. Other embodiments of the example of an EMLMR transition request initiated by the AP MLD 1500 could be used without departing from the scope of this disclosure.

As illustrated in FIG. 15, according to one embodiment, the AP MLD can send the EML Operating Mode Notification frame to its associated non-AP MLD as a request to transition into the EMLMR mode. Upon receiving the request from the AP MLD, the non-AP MLD can send a response to the AP MLD by sending an EML Operating Mode Notification frame. In the response frame, the non-AP MLD can set the same set of parameters as that of the request frame from the AP MLD or a different set of parameters as that of the request frame. As illustrated in FIG. 15, the EMLMR transition request is initiated by the AP MLD, and different sets of links are indicated in the request and response frames.

The above flowcharts illustrate example methods that can be implemented in accordance with the principles of the present disclosure and various changes could be made to the methods or processes illustrated in the flowcharts. For example, while shown as a series of steps, various steps could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A non-access point (AP) multilink device (MLD) comprising:
    a station (STA) comprising:
        a transceiver configured to;
            receive, from an AP affiliated with an AP MLD, a first enhanced multi-link operating mode notification (EML OMN) frame associated with a request to transition to an enhanced multi-link multi-radio (EMLMR) mode, wherein the first EML OMN frame indicates a first set of links for an EMLMR operation between the AP MLD and the non-AP MLD and indicates whether the AP MLD accepts or rejects transitioning to the EMLMR mode;
            transmit, to the AP MLD, a second EML OMN frame associated with the request to transition to the EMLMR mode, wherein the second EML OMN frame indicates a second set of links for the EMLMR operation different than the first set of links indicated in the first EML OMN frame; and
            based on the indication whether the AP MLD accepts or rejects transitioning to the EMLMR mode, transmit, to the AP MLD, a third EML OMN frame associated with the request to transition to the EMLMR mode, wherein the third EML OMN frame indicates a third set of links for the EMLMR operation different than the first set of links and the second set of links; and
        a processor operably coupled to the transceiver, the processor configured, based on the first set of links and the second set of links, to negotiate links for the EMLMR operation between the AP MLD and the non-AP MLD before transitioning to the EMLMR mode.

2. The non-AP MLD of claim 1, wherein:
    the second EML OMN frame requests the transition to the EMLMR mode, and
    the first EML OMN frame is in response to the second EML OMN frame.

3. The non-AP MLD of claim 2, wherein:
    the first EML OMN frame indicates that the AP MLD rejects transitioning to the EMLMR mode, and
    the transceiver transmits the third EML OMN frame.

4. The non-AP MLD of claim 2, wherein:
    the first EML OMN frame indicates that the AP MLD accepts transitioning to the EMLMR mode.

5. The non-AP MLD of claim 1, wherein the first EML OMN frame requests the transition to the EMLMR mode and the second EML OMN frame is in response to the first EML OMN frame.

6. The non-AP MLD of claim 1, wherein:
    the second EML OMN frame indicates that the non-AP MLD accepts transitioning to the EMLMR mode.

7. An access point (AP) multi-link device (MLD) comprising:
    an AP comprising:
        a transceiver configured to:
            transmit, to a station (STA) associated with a non-AP MLD, a first enhanced multi-link operating mode notification (EML OMN) frame associated with a request to transition to an enhanced multi-link multi-radio (EMLMR) mode, the first EML OMN frame indicating a first set of links for an EMLMR operation between the AP MLD and the non-AP MLD and indicating whether the AP MLD accepts or rejects transitioning to the EMLMR mode;
            receive, from the non-AP MLD, a second EML OMN frame associated with the request to transition to the EMLMR mode, the second EML OMN frame indicating a second set of links for the EMLMR operation different than the first set of links indicated in the first EML OMN frame; and
            based on the indication whether the AP MLD accepts or rejects transitioning to the EMLMR mode, transmit, to the non-AP MLD, a third EML OMN frame associated with the request to transition to the EMLMR mode, wherein the third EML OMN frame indicates a third set of links for the EMLMR operation different than the first set of links and the second set of links; and
        a processor operably coupled to the transceiver, the processor configured to:
            generate the first;
            determine whether to accept transitioning to the EMLMR mode;
            configure the first EML OMN frame based on whether transitioning to the EMLMR mode is accepted; and
            negotiate links for EMLMR operation between the AP MLD and the non-AP MLD before transitioning to the EMLMR mode based on the first set of links and the second set of links.

8. The AP MLD of claim 7, wherein:
    a second EML OMN frame requests the transition to the EMLMR mode, and
    the first EML OMN frame is in response to the second EML OMN frame.

9. The AP MLD of claim 8, wherein:
    the first EML OMN frame indicates that the AP MLD rejects transitioning to the EMLMR mode, and
    the transceiver transmits the third EML OMN frame.

10. The AP MLD of claim 8, wherein:
    the first EML OMN frame indicates that the AP MLD accepts transitioning to the EMLMR mode.

11. The AP MLD of claim 7, wherein the first EML OMN frame requests the transition to the EMLMR mode and the second EML OMN frame is in response to the first EML OMN frame.

12. The AP MLD of claim 7, wherein:
the second EML OMN frame indicates that the non-AP MLD accepts transitioning to the EMLMR mode.

13. A method of wireless communication performed by a non-access point (AP) multi-link device (MLD), the method comprising:
receiving, from an AP affiliated with an AP MLD, a first enhanced multi-link operating mode notification (EML OMN) frame associated with a request to transition to an enhanced multi-link multi-radio (EMLMR) mode, wherein the first EML OMN frame indicates a first set of links for an EMLMR operation between the AP MLD and the non-AP MLD and indicates whether the AP MLD accepts or rejects transitioning to the EMLMR mode;
transmitting, to the AP MLD, a second EML OMN frame associated with the request to transition to the EMLMR mode, wherein the second EML OMN frame indicates a second set of links for the EMLMR operation different than the first set of links indicated in the first EML OMN frame;
based on the indication whether the AP MLD accepts or rejects transitioning to the EMLMR mode, transmitting, to the AP MLD, a third EML OMN frame associated with the request to transition to the EMLMR mode, wherein the third EML OMN frame indicates a third set of links for the EMLMR operation different than the first set of links and the second set of links; and
based on the first set of links and the second set of links, negotiating links for EMLMR operation between the AP MLD and the non-AP MLD before transitioning to the EMLMR mode.

14. The method of claim 13, wherein:
the second EML OMN frame requests the transition to the EMLMR mode, and
the first EML OMN frame is in response to the second EML OMN frame.

15. The method of claim 14, wherein the first EML OMN frame indicates that the AP MLD rejects transitioning to the EMLMR mode, the method further comprising:
transmitting, to the AP MLD, the third EML OMN frame.

16. The method of claim 14, wherein:
the first EML OMN frame indicates that the AP MLD accepts transitioning to the EMLMR mode.

17. The method of claim 13, wherein the first EML OMN frame requests the transition to the EMLMR mode and the second EML OMN frame is in response to the first EML OMN frame.

18. The method of claim 13, wherein the second EML OMN frame indicates that the non-AP MLD accepts transitioning to the EMLMR mode.

* * * * *